(12) United States Patent
Ortiz et al.

(10) Patent No.: US 11,791,547 B2
(45) Date of Patent: *Oct. 17, 2023

(54) NOZZLE CAP ASSEMBLY

(71) Applicant: Mueller International, LLC, Atlanta, GA (US)

(72) Inventors: Jorge Isaac Ortiz, Wausau, WI (US); David James Carlos Dunn, Limehouse (CA); Yanlong Li, Hixson, TN (US); Jesse Alvin Faunce, Raynham, MA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,230

(22) Filed: Jun. 6, 2022

(65) Prior Publication Data

US 2022/0302580 A1 Sep. 22, 2022

Related U.S. Application Data

(63) Continuation of application No. 17/245,181, filed on Apr. 30, 2021, now Pat. No. 11,527,821, which is a
(Continued)

(51) Int. Cl.
*H01Q 1/42* (2006.01)
*H01Q 1/22* (2006.01)
(Continued)

(52) U.S. Cl.
CPC ............... *H01Q 1/42* (2013.01); *E03B 9/06* (2013.01); *H01Q 1/22* (2013.01); *H01Q 1/38* (2013.01); *H01Q 1/44* (2013.01); *H01Q 21/205* (2013.01)

(58) Field of Classification Search
CPC .. H01Q 1/42; H01Q 1/22; H01Q 1/38; H01Q 1/44; H01Q 21/205; H01Q 21/28; H01Q 21/30; E03B 9/06
See application file for complete search history.

(56) References Cited

U.S. PATENT DOCUMENTS 1,738,094 A   12/1929   Caldwell
2,171,173 A   8/1939    Coyer
(Continued)

FOREIGN PATENT DOCUMENTS

AU   2011265675   5/2015
AU   2015202550   11/2017
(Continued)

OTHER PUBLICATIONS

US 11,296,403 B2, 04/2022, Gibson et al. (withdrawn)
(Continued)

*Primary Examiner* — Ricardo I Magallanes
(74) *Attorney, Agent, or Firm* — Taylor English Duma LLP

(57) ABSTRACT

A nozzle cap assembly can include a nozzle cap body defining a top end and a bottom end, the nozzle cap body defining a base positioned at the top end and a curved side wall extend from the base down to the bottom end; an enclosure coupled to the top end, the enclosure rotationally fixed relative to the nozzle cap body, the enclosure at least partially defining an enclosure cavity; and a nut base positioned opposite from the nozzle cap body, the enclosure positioned between the nut base and the base.

20 Claims, 18 Drawing Sheets

Related U.S. Application Data continuation of application No. 16/354,939, filed on Mar. 15, 2019, now Pat. No. 11,469,494, which is a continuation of application No. 15/043,057, filed on Feb. 12, 2016, now Pat. No. 10,283,857.

(51) Int. Cl.
    *H01Q 1/38*      (2006.01)
    *H01Q 1/44*      (2006.01)
    *E03B 9/06*      (2006.01)
    *H01Q 21/20*     (2006.01)

(56) References Cited

U.S. PATENT DOCUMENTS

| | | |
|---|---|---|
| 3,254,528 A | 6/1966 | Michael |
| 3,592,967 A | 7/1971 | Harris |
| 3,612,922 A | 10/1971 | Furnival |
| 3,662,600 A | 5/1972 | Rosano, Jr. et al. |
| 3,673,856 A | 7/1972 | Panigati |
| 3,731,534 A | 5/1973 | Painley et al. |
| 3,815,129 A | 6/1974 | Sweany |
| 4,000,753 A | 1/1977 | Ellis |
| 4,056,970 A | 11/1977 | Sollish |
| 4,083,229 A | 4/1978 | Anway |
| 4,333,028 A | 6/1982 | Panton |
| 4,431,873 A | 2/1984 | Dunn et al. |
| 4,462,249 A | 7/1984 | Adams |
| 4,467,236 A | 8/1984 | Kolm et al. |
| 4,543,817 A | 10/1985 | Sugiyama |
| 4,763,686 A | 8/1988 | Laurel |
| 4,796,466 A | 1/1989 | Farmer |
| 4,844,396 A | 7/1989 | Norton |
| 4,893,679 A | 1/1990 | Martin et al. |
| 4,930,358 A | 6/1990 | Motegi et al. |
| 4,984,498 A | 1/1991 | Fishman |
| 5,038,614 A | 8/1991 | Bseisu et al. |
| 5,052,215 A | 10/1991 | Lewis |
| 5,078,006 A | 1/1992 | Maresca et al. |
| 5,085,082 A | 2/1992 | Cantor et al. |
| 5,090,234 A | 2/1992 | Maresca et al. |
| 5,117,676 A | 6/1992 | Chang |
| 5,118,464 A | 6/1992 | Richardson et al. |
| 5,163,314 A | 11/1992 | Maresca et al. |
| 5,165,280 A | 11/1992 | Sternberg et al. |
| 5,170,657 A | 12/1992 | Maresca et al. |
| 5,174,155 A | 12/1992 | Sugimoto |
| 5,184,851 A | 2/1993 | Sparling et al. |
| 5,187,973 A | 2/1993 | Kunze et al. |
| 5,189,904 A | 3/1993 | Maresca et al. |
| 5,201,226 A | 4/1993 | John et al. |
| 5,203,202 A | 4/1993 | Spencer |
| 5,205,173 A | 4/1993 | Allen |
| 5,209,125 A | 5/1993 | Kalinoski et al. |
| 5,218,859 A | 6/1993 | Stenstrom et al. |
| 5,243,862 A | 9/1993 | Latimer |
| 5,254,944 A | 10/1993 | Holmes et al. |
| 5,272,646 A | 12/1993 | Farmer |
| 5,279,160 A | 1/1994 | Koch |
| 5,287,884 A | 2/1994 | Cohen |
| 5,298,894 A | 3/1994 | Cerny et al. |
| 5,301,985 A | 4/1994 | Terzini |
| 5,303,592 A | 4/1994 | Livingston |
| 5,319,956 A | 6/1994 | Bogle et al. |
| 5,333,501 A | 8/1994 | Okada et al. |
| 5,335,547 A | 8/1994 | Nakajima et al. |
| 5,343,737 A | 9/1994 | Baumoel |
| 5,349,568 A | 9/1994 | Kupperman et al. |
| 5,351,655 A | 10/1994 | Nuspl |
| 5,361,636 A | 11/1994 | Farstad et al. |
| 5,367,911 A | 11/1994 | Jewell et al. |
| 5,385,049 A | 1/1995 | Hunt et al. |
| 5,396,800 A | 3/1995 | Drinon et al. |
| 5,408,883 A | 4/1995 | Clark et al. |
| 5,416,724 A | 5/1995 | Savic |
| 5,461,906 A | 10/1995 | Bogle et al. |
| 5,519,184 A | 5/1996 | Umlas |
| 5,526,691 A | 6/1996 | Latimer et al. |
| 5,531,099 A | 7/1996 | Russo |
| 5,548,530 A | 8/1996 | Baumoel |
| 5,581,037 A | 12/1996 | Kwun et al. |
| 5,591,912 A | 1/1997 | Spisak et al. |
| 5,602,327 A | 2/1997 | Torizuka et al. |
| 5,611,948 A | 3/1997 | Hawkins |
| 5,619,423 A | 4/1997 | Scrantz |
| 5,623,203 A | 4/1997 | Hosohara et al. |
| 5,633,467 A | 5/1997 | Paulson |
| 5,639,958 A | 6/1997 | Lange |
| 5,655,561 A | 8/1997 | Wendel et al. |
| 5,686,828 A | 11/1997 | Peterman et al. |
| 5,708,195 A | 1/1998 | Kurisu et al. |
| 5,708,211 A | 1/1998 | Jepson et al. |
| 5,746,611 A | 5/1998 | Brown et al. |
| 5,754,101 A | 5/1998 | Tsunetomi et al. |
| 5,760,306 A | 6/1998 | Wyatt et al. |
| 5,789,720 A | 8/1998 | Lagally et al. |
| 5,798,457 A | 8/1998 | Paulson |
| 5,838,633 A | 11/1998 | Sinha |
| 5,866,820 A | 2/1999 | Camplin et al. |
| 5,892,163 A | 4/1999 | Johnson |
| 5,898,412 A | 4/1999 | Jones et al. |
| 5,907,100 A | 5/1999 | Cook |
| 5,965,818 A | 10/1999 | Wang |
| 5,970,434 A | 10/1999 | Brophy et al. |
| 5,974,862 A | 11/1999 | Lander et al. |
| 5,987,990 A | 11/1999 | Worthington et al. |
| 6,000,277 A | 12/1999 | Smith |
| 6,000,288 A | 12/1999 | Kwun et al. |
| 6,003,376 A | 12/1999 | Burns et al. |
| 6,023,986 A | 2/2000 | Smith et al. |
| 6,035,717 A | 3/2000 | Carodiskey |
| 6,058,957 A | 5/2000 | Honigsbaum |
| 6,076,407 A | 6/2000 | Levesque et al. |
| 6,082,193 A | 7/2000 | Paulson |
| 6,089,253 A | 7/2000 | Sterling et al. |
| 6,102,444 A | 8/2000 | Kozey |
| 6,104,349 A | 8/2000 | Cohen |
| 6,125,703 A | 10/2000 | MacLauchlan et al. |
| 6,127,823 A | 10/2000 | Atherton |
| 6,127,987 A | 10/2000 | Maruyama et al. |
| 6,133,885 A | 10/2000 | Luniak et al. |
| 6,138,512 A | 10/2000 | Roberts et al. |
| 6,138,514 A | 10/2000 | Iwamoto et al. |
| 6,164,137 A | 12/2000 | Hancock et al. |
| 6,170,334 B1 | 1/2001 | Paulson |
| 6,175,380 B1 | 1/2001 | Van Den Bosch |
| 6,181,294 B1 | 1/2001 | Porter et al. |
| 6,192,352 B1 | 2/2001 | Alouani et al. |
| 6,243,657 B1 | 6/2001 | Tuck et al. |
| 6,267,000 B1 | 7/2001 | Harper et al. |
| 6,276,213 B1 | 8/2001 | Lee et al. |
| 6,296,066 B1 | 10/2001 | Terry |
| 6,343,510 B1 | 2/2002 | Neeson et al. |
| 6,363,788 B1 | 4/2002 | Gorman et al. |
| 6,389,881 B1 | 5/2002 | Yang et al. |
| 6,401,525 B1 | 6/2002 | Jamieson |
| 6,404,343 B1 | 6/2002 | Andou et al. |
| 6,442,999 B1 | 9/2002 | Baumoel |
| 6,450,542 B1 | 9/2002 | McCue |
| 6,453,247 B1 | 9/2002 | Hunaidi |
| 6,470,749 B1 | 10/2002 | Han et al. |
| 6,530,263 B1 | 3/2003 | Chana |
| 6,561,032 B1 | 5/2003 | Hunaidi |
| 6,567,006 B1 | 5/2003 | Lander et al. |
| 6,578,422 B2 | 6/2003 | Lam et al. |
| 6,595,038 B2 | 7/2003 | Williams et al. |
| 6,606,059 B1 | 8/2003 | Barabash |
| 6,624,628 B1 | 9/2003 | Kwun et al. |
| 6,639,562 B2 | 10/2003 | Suganthan et al. |
| 6,647,762 B1 | 11/2003 | Roy |
| 6,651,503 B2 | 11/2003 | Bazarov et al. |
| 6,666,095 B2 | 12/2003 | Thomas et al. |
| 6,667,709 B1 | 12/2003 | Hansen et al. |
| 6,707,762 B1 | 3/2004 | Goodman et al. |

(56) References Cited

U.S. PATENT DOCUMENTS

| | | |
|---|---|---|
| 6,710,600 B1 | 3/2004 | Kopecki et al. |
| 6,725,705 B1 | 4/2004 | Huebler et al. |
| 6,734,674 B1 | 5/2004 | Struse |
| 6,745,136 B2 | 6/2004 | Lam et al. |
| 6,751,560 B1 | 6/2004 | Tingley et al. |
| 6,763,730 B1 | 7/2004 | Wray |
| 6,772,636 B2 | 8/2004 | Lam et al. |
| 6,772,637 B2 | 8/2004 | Bazarov et al. |
| 6,772,638 B2 | 8/2004 | Matney et al. |
| 6,781,369 B2 | 8/2004 | Paulson et al. |
| 6,782,751 B2 | 8/2004 | Linares et al. |
| 6,789,427 B2 | 9/2004 | Batzinger et al. |
| 6,791,318 B2 | 9/2004 | Paulson et al. |
| 6,799,455 B1 | 10/2004 | Neefeldt et al. |
| 6,799,466 B2 | 10/2004 | Chinn |
| 6,813,949 B2 | 11/2004 | Masaniello et al. |
| 6,813,950 B2 | 11/2004 | Glascock et al. |
| 6,816,072 B2 | 11/2004 | Zoratti |
| 6,820,016 B2 | 11/2004 | Brown et al. |
| 6,822,742 B1 | 11/2004 | Kalayeh et al. |
| 6,843,131 B2 | 1/2005 | Graff et al. |
| 6,848,313 B2 | 2/2005 | Krieg et al. |
| 6,851,319 B2 | 2/2005 | Ziola et al. |
| 6,889,703 B2 | 5/2005 | Bond |
| 6,904,818 B2 | 6/2005 | Harthorn et al. |
| 6,912,472 B2 | 6/2005 | Mizushina et al. |
| 6,920,792 B2 | 7/2005 | Flora et al. |
| 6,931,931 B2 | 8/2005 | Graff et al. |
| 6,935,178 B2 | 8/2005 | Prause |
| 6,945,113 B2 | 9/2005 | Siverling et al. |
| 6,957,157 B2 | 10/2005 | Lander |
| 6,968,727 B2 | 11/2005 | Kwun et al. |
| 6,978,832 B2 | 12/2005 | Gardner et al. |
| 7,051,577 B2 | 5/2006 | Komninos |
| 7,080,557 B2 | 7/2006 | Adnan |
| 7,109,929 B1 | 9/2006 | Ryken, Jr. |
| 7,111,516 B2 | 9/2006 | Bazarov et al. |
| 7,140,253 B2 | 11/2006 | Merki et al. |
| 7,143,659 B2 | 12/2006 | Stout et al. |
| 7,171,854 B2 | 2/2007 | Nagashima et al. |
| 7,231,331 B2 | 6/2007 | Davis |
| 7,234,355 B2 | 6/2007 | Dewangan et al. |
| 7,240,574 B2 | 7/2007 | Sapelnikov |
| 7,255,007 B2 | 8/2007 | Messer et al. |
| 7,261,002 B1 | 8/2007 | Gysling et al. |
| 7,266,992 B2 | 9/2007 | Shamout et al. |
| 7,274,996 B2 | 9/2007 | Lapinski |
| 7,283,063 B2 | 10/2007 | Salser, Jr. |
| 7,284,433 B2 | 10/2007 | Ales et al. |
| 7,293,461 B1 | 11/2007 | Girndt |
| 7,299,697 B2 | 11/2007 | Siddu et al. |
| 7,310,877 B2 | 12/2007 | Cao et al. |
| 7,328,618 B2 | 2/2008 | Hunaidi et al. |
| 7,331,215 B2 | 2/2008 | Bond |
| 7,356,444 B2 | 4/2008 | Blemel |
| 7,360,462 B2 | 4/2008 | Nozaki et al. |
| 7,373,808 B2 | 5/2008 | Zanker et al. |
| 7,380,466 B2 | 6/2008 | Deeg |
| 7,383,721 B2 | 6/2008 | Parsons et al. |
| 7,392,709 B2 | 7/2008 | Eckert |
| 7,405,391 B2 | 7/2008 | Ogisu et al. |
| 7,412,882 B2 | 8/2008 | Lazar et al. |
| 7,412,890 B1 | 8/2008 | Johnson et al. |
| 7,414,395 B2 | 8/2008 | Gao et al. |
| 7,426,879 B2 | 9/2008 | Nozaki et al. |
| 7,458,267 B2 | 12/2008 | McCoy |
| 7,475,596 B2 | 1/2009 | Hunaidi et al. |
| 7,493,817 B2 | 2/2009 | Germata |
| 7,523,666 B2 | 4/2009 | Thompson et al. |
| 7,526,944 B2 | 5/2009 | Sabata et al. |
| 7,530,270 B2 | 5/2009 | Nozaki et al. |
| 7,543,500 B2 | 6/2009 | Litzenberg et al. |
| 7,554,345 B2 | 6/2009 | Vokey |
| 7,564,540 B2 | 7/2009 | Paulson |
| 7,587,942 B2 | 9/2009 | Smith et al. |
| 7,590,496 B2 | 9/2009 | Blemel |
| 7,596,458 B2 | 9/2009 | Lander |
| 7,607,351 B2 | 10/2009 | Allison et al. |
| 7,623,427 B2 | 11/2009 | Jann et al. |
| 7,647,829 B2 | 1/2010 | Junker et al. |
| 7,650,790 B2 | 1/2010 | Wright |
| 7,657,403 B2 | 2/2010 | Stripf et al. |
| 7,668,670 B2 | 2/2010 | Lander |
| 7,680,625 B2 | 3/2010 | Trowbridge et al. |
| 7,690,258 B2 | 4/2010 | Minagi et al. |
| 7,694,564 B2 | 4/2010 | Brignac et al. |
| 7,696,940 B1 | 4/2010 | MacDonald |
| 7,711,217 B2 | 5/2010 | Takahashi et al. |
| 7,751,989 B2 | 7/2010 | Owens et al. |
| 7,810,378 B2 | 10/2010 | Hunaidi et al. |
| 7,980,317 B1 | 7/2011 | Preta et al. |
| 8,009,108 B2 | 8/2011 | Eisenbeis et al. |
| 8,319,508 B2 | 11/2012 | Vokey |
| 8,353,309 B1 | 1/2013 | Embry et al. |
| 8,614,745 B1 | 12/2013 | Al Azemi |
| 8,657,021 B1 | 2/2014 | Preta et al. |
| 8,668,206 B2 | 3/2014 | Ball |
| 8,674,830 B2 | 3/2014 | Lanham et al. |
| 8,823,509 B2 | 9/2014 | Hyland et al. |
| 8,843,241 B2 | 9/2014 | Saberi et al. |
| 8,931,505 B2 | 1/2015 | Hyland et al. |
| 9,053,519 B2 | 6/2015 | Scolnicov et al. |
| 9,291,520 B2 | 3/2016 | Fleury, Jr. et al. |
| 9,315,973 B2 | 4/2016 | Varman et al. |
| 9,496,943 B2 | 11/2016 | Parish et al. |
| 9,528,903 B2 | 12/2016 | Zusman |
| 9,562,623 B2 | 2/2017 | Clark |
| 9,593,999 B2 | 3/2017 | Fleury |
| 9,670,650 B2 | 6/2017 | Pinney et al. |
| 9,772,250 B2 | 9/2017 | Richarz et al. |
| 9,780,433 B2 | 10/2017 | Schwengler et al. |
| 9,799,204 B2 | 10/2017 | Hyland et al. |
| 9,849,322 B2 | 12/2017 | Hyland et al. |
| 9,861,848 B2 | 1/2018 | Hyland et al. |
| 9,970,805 B2 | 5/2018 | Cole et al. |
| 10,175,135 B2 | 1/2019 | Dintakurt et al. |
| 10,283,857 B2 | 5/2019 | Ortiz et al. |
| 10,305,178 B2 | 5/2019 | Gibson et al. |
| 10,317,384 B2 | 6/2019 | Morrow et al. |
| 10,386,257 B2 | 8/2019 | Fleury, Jr. et al. |
| 10,857,403 B2 | 12/2020 | Hyland et al. |
| 10,859,462 B2 | 12/2020 | Gibson et al. |
| 10,881,888 B2 | 1/2021 | Hyland et al. |
| 11,047,761 B1 | 6/2021 | Frackelton et al. |
| 11,067,464 B2 | 7/2021 | Moreno et al. |
| 11,336,004 B2 | 5/2022 | Gibson et al. |
| 11,342,656 B2 | 5/2022 | Gibson et al. |
| 11,422,054 B2 | 8/2022 | Gibson et al. |
| 11,469,494 B2 | 10/2022 | Ortiz et al. |
| 11,473,993 B2 | 10/2022 | Gibson et al. |
| 11,527,821 B2 | 12/2022 | Ortiz et al. |
| 11,542,690 B2 | 1/2023 | Gibson et al. |
| 11,590,376 B2 | 2/2023 | Hyland et al. |
| 11,624,674 B2 | 4/2023 | Gibson et al. |
| 11,630,021 B2 | 4/2023 | Fleury, Jr. et al. |
| 11,652,284 B2 | 5/2023 | Ortiz et al. |
| 11,680,865 B2 | 6/2023 | Fleury, Jr. et al. |
| 11,692,901 B2 | 7/2023 | Gibson et al. |
| 2001/0045129 A1 | 11/2001 | Williams et al. |
| 2002/0043549 A1 | 4/2002 | Taylor et al. |
| 2002/0124633 A1 | 9/2002 | Yang et al. |
| 2002/0159584 A1 | 10/2002 | Sindalovsky et al. |
| 2003/0107485 A1* | 6/2003 | Zoratti ................... A62C 31/28 340/568.1 |
| 2003/0150488 A1 | 8/2003 | Fleury, Jr. et al. |
| 2003/0193193 A1 | 10/2003 | Harrington et al. |
| 2004/0129312 A1 | 7/2004 | Cuzzo et al. |
| 2004/0173006 A1 | 9/2004 | McCoy et al. |
| 2004/0187922 A1 | 9/2004 | Fleury, Jr. et al. |
| 2004/0201215 A1 | 10/2004 | Steingass |
| 2005/0005680 A1 | 1/2005 | Anderson |
| 2005/0067022 A1 | 3/2005 | Istre |
| 2005/0072214 A1 | 4/2005 | Cooper |
| 2005/0121880 A1 | 6/2005 | Santangelo |

(56) References Cited

U.S. PATENT DOCUMENTS

| | | |
|---|---|---|
| 2005/0153586 A1 | 7/2005 | Girinon |
| 2005/0279169 A1 | 12/2005 | Lander |
| 2006/0101915 A1 | 5/2006 | Thompson et al. |
| 2006/0174707 A1 | 8/2006 | Zhang |
| 2006/0201550 A1 | 9/2006 | Blyth et al. |
| 2006/0283251 A1 | 12/2006 | Hunaidi |
| 2006/0284784 A1 | 12/2006 | Smith et al. |
| 2007/0044552 A1 | 3/2007 | Huang |
| 2007/0051187 A1 | 3/2007 | McDearmon |
| 2007/0113618 A1 | 5/2007 | Yokoi et al. |
| 2007/0130317 A1 | 6/2007 | Lander |
| 2007/0295406 A1 | 12/2007 | German et al. |
| 2008/0078567 A1 | 4/2008 | Miller et al. |
| 2008/0079640 A1 | 4/2008 | Yang |
| 2008/0168840 A1 | 7/2008 | Seeley et al. |
| 2008/0189056 A1 | 8/2008 | Heidl et al. |
| 2008/0238711 A1 | 10/2008 | Payne et al. |
| 2008/0281534 A1 | 11/2008 | Hurley |
| 2008/0307623 A1 | 12/2008 | Furukawa |
| 2008/0314122 A1 | 12/2008 | Hunaidi |
| 2009/0044628 A1 | 2/2009 | Lotscher |
| 2009/0133887 A1 | 5/2009 | Garcia et al. |
| 2009/0139336 A1 | 6/2009 | Trowbridge, Jr. et al. |
| 2009/0182099 A1 | 7/2009 | Noro et al. |
| 2009/0214941 A1 | 8/2009 | Buck et al. |
| 2009/0278293 A1 | 11/2009 | Yoshinaka et al. |
| 2009/0301571 A1 | 12/2009 | Ruhs |
| 2010/0077234 A1 | 3/2010 | Das |
| 2010/0156632 A1 | 6/2010 | Hyland et al. |
| 2010/0259461 A1 | 10/2010 | Eisenbeis et al. |
| 2010/0290201 A1 | 11/2010 | Takeuchi et al. |
| 2010/0295672 A1 | 11/2010 | Hyland et al. |
| 2011/0063124 A1 | 3/2011 | Bartram et al. |
| 2011/0063172 A1* | 3/2011 | Podduturi ............... H01Q 5/371 343/700 MS |
| 2011/0066297 A1 | 3/2011 | Saberi |
| 2011/0079402 A1 | 4/2011 | Darby et al. |
| 2011/0102281 A1 | 5/2011 | Su |
| 2011/0162463 A1 | 7/2011 | Allen |
| 2011/0308638 A1 | 12/2011 | Hyland et al. |
| 2012/0007743 A1 | 1/2012 | Solomon |
| 2012/0007744 A1 | 1/2012 | Pal et al. |
| 2012/0169560 A1 | 7/2012 | Lee et al. |
| 2012/0296580 A1 | 11/2012 | Barkay |
| 2012/0324985 A1 | 12/2012 | Gu et al. |
| 2013/0036796 A1 | 2/2013 | Fleury et al. |
| 2013/0041601 A1 | 2/2013 | Dintakurti et al. |
| 2013/0049968 A1 | 2/2013 | Fleury, Jr. |
| 2013/0145826 A1 | 6/2013 | Richarz et al. |
| 2013/0211797 A1 | 8/2013 | Scolnicov |
| 2013/0229262 A1 | 9/2013 | Bellows |
| 2013/0298664 A1 | 11/2013 | Gillette, II et al. |
| 2013/0321231 A1 | 12/2013 | Flores-Cuadras |
| 2014/0206210 A1 | 7/2014 | Ritner |
| 2014/0225787 A1 | 8/2014 | Ramachandran et al. |
| 2014/0261699 A1 | 9/2014 | Gifford |
| 2014/0373941 A1* | 12/2014 | Varman .................. F16K 35/10 137/296 |
| 2015/0070221 A1 | 3/2015 | Schwengler et al. |
| 2015/0082868 A1 | 3/2015 | Hyland |
| 2015/0128714 A1 | 5/2015 | Moss |
| 2016/0001114 A1 | 1/2016 | Hyland |
| 2016/0013565 A1 | 1/2016 | Ortiz |
| 2016/0018283 A1 | 1/2016 | Fleury et al. |
| 2016/0097696 A1 | 4/2016 | Zusman |
| 2017/0072238 A1 | 3/2017 | Silvers et al. |
| 2017/0121949 A1 | 5/2017 | Fleury et al. |
| 2017/0130431 A1 | 5/2017 | Pinney et al. |
| 2017/0237158 A1 | 8/2017 | Gibson |
| 2017/0237165 A1 | 8/2017 | Ortiz et al. |
| 2018/0080849 A1 | 3/2018 | Showcatally et al. |
| 2018/0093117 A1 | 4/2018 | Hyland et al. |
| 2018/0224349 A1 | 8/2018 | Fleury, Jr. et al. |
| 2019/0024352 A1 | 1/2019 | Ozburn |
| 2019/0214717 A1 | 7/2019 | Gibson et al. |
| 2019/0214718 A1 | 7/2019 | Ortiz et al. |
| 2019/0316983 A1 | 10/2019 | Fleury, Jr. et al. |
| 2020/0069987 A1 | 3/2020 | Hyland et al. |
| 2020/0072697 A1 | 3/2020 | Gibson et al. |
| 2020/0212549 A1 | 7/2020 | Gibson et al. |
| 2020/0232863 A1 | 7/2020 | Moreno et al. |
| 2020/0232864 A1 | 7/2020 | Moreno et al. |
| 2020/0378859 A1 | 12/2020 | Gibson et al. |
| 2021/0023408 A1 | 1/2021 | Hyland et al. |
| 2021/0041323 A1 | 2/2021 | Gibson et al. |
| 2021/0247261 A1 | 8/2021 | Gibson et al. |
| 2021/0249765 A1 | 8/2021 | Ortiz et al. |
| 2021/0355661 A1 | 11/2021 | Gibson et al. |
| 2022/0082467 A1 | 3/2022 | Fleury, Jr. et al. |
| 2022/0190471 A1 | 6/2022 | Gibson et al. |
| 2022/0291073 A1 | 9/2022 | Gibson et al. |
| 2022/0294104 A1 | 9/2022 | Ortiz et al. |
| 2022/0320721 A1 | 10/2022 | Gibson et al. |
| 2023/0092513 A1 | 3/2023 | Gibson et al. |
| 2023/0108605 A1 | 4/2023 | Hyland et al. |
| 2023/0184617 A1 | 6/2023 | Gibson et al. |

FOREIGN PATENT DOCUMENTS

| | | |
|---|---|---|
| AU | 2017248541 | 3/2019 |
| CA | 2154433 | 1/1997 |
| CA | 2397174 | 8/2008 |
| CA | 2634739 | 6/2015 |
| CA | 3010333 | 7/2020 |
| CA | 2766850 | 8/2020 |
| CA | 3023529 | 8/2020 |
| CA | 3070690 | 11/2020 |
| CA | 2842042 | 1/2021 |
| CA | 3057167 | 3/2021 |
| CA | 3057202 | 5/2021 |
| CA | 3060512 | 6/2021 |
| CA | 3010345 | 7/2021 |
| CA | 3095465 | 9/2022 |
| CA | 3116787 | 7/2023 |
| CA | 3113517 | 8/2023 |
| CA | 3119150 | 8/2023 |
| CA | 3102529 | 9/2023 |
| CN | 1831478 | 6/2013 |
| DE | 4211038 | 10/1993 |
| DE | 19757581 | 7/1998 |
| EP | 0711986 | 5/1996 |
| EP | 1052492 | 11/2000 |
| EP | 1077370 | 2/2001 |
| EP | 1077371 | 2/2001 |
| EP | 3293315 | 3/2018 |
| EP | 3449062 | 6/2023 |
| FR | 2439990 | 5/1980 |
| GB | 2250820 | 6/1992 |
| GB | 2269900 | 2/1994 |
| GB | 2367362 | 4/2002 |
| GB | 2421311 | 6/2006 |
| GB | 2550908 | 12/2017 |
| JP | 59170739 | 9/1984 |
| JP | 60111132 | 6/1985 |
| JP | 08250777 | 9/1996 |
| JP | H10-2744 | 1/1998 |
| JP | 11201859 | 7/1999 |
| JP | H11210028 | 8/1999 |
| JP | 2000131179 | 5/2000 |
| JP | 2002206965 | 7/2002 |
| JP | 2002310840 | 10/2002 |
| JP | 3595856 | 12/2004 |
| JP | 2005315663 | 11/2005 |
| JP | 2005321935 | 11/2005 |
| JP | 2006062414 | 3/2006 |
| JP | 2006062716 | 3/2006 |
| JP | 2007047139 | 2/2007 |
| JP | 2010068017 | 3/2010 |
| JP | 2013528732 | 7/2013 |
| JP | H5654124 | 11/2014 |
| KR | 101785664 | 11/2017 |
| TW | 201117974 | 6/2011 |
| WO | 9850771 | 11/1998 |
| WO | 0151904 | 7/2001 |

(56) References Cited

FOREIGN PATENT DOCUMENTS

| WO | 03049528 | 6/2003 |
|---|---|---|
| WO | 2004073115 | 8/2004 |
| WO | 2005052573 | 6/2005 |
| WO | 2008047159 | 4/2008 |
| WO | 2009057214 | 5/2009 |
| WO | 2010135587 | 11/2010 |
| WO | 2011021039 | 2/2011 |
| WO | 2011058561 | 5/2011 |
| WO | 2011159403 | 12/2011 |
| WO | 2012000088 | 1/2012 |
| WO | 2012153147 | 11/2012 |
| WO | 2013025526 | 2/2013 |
| WO | 2014016625 | 1/2014 |
| WO | 2017139029 | 8/2017 |
| WO | 2017139030 | 8/2017 |
| WO | 2020050946 | 3/2020 |
| WO | 2021231163 | 11/2021 |

OTHER PUBLICATIONS

US 11,309,624 B2, 04/2022, Gibson et al. (withdrawn)
US 11,378,481 B2, 07/2022, Gibson et al. (withdrawn)
US 11,378,482 B2, 07/2022, Gibson et al. (withdrawn)
US 11,404,772 B2, 08/2022, Ortiz et al. (withdrawn)
Ortiz, Jorge Isaac; Office Action for European patent application No. 16890114.8, filed Dec. 20, 2016, dated Oct. 4, 2021, 7 pgs.
Ortiz, Jorge Isaac; Office Action for Canadian patent application No. 3,010,333, filed Dec. 20, 2016, dated Dec. 6, 2019, 4 pgs.
Oriiz, Jorge Isaac; Office Action for Canadian patent application No. 3,070,690, filed Dec. 20, 2016, dated Mar. 10, 2020, 3 pgs.
Ortiz, Jorge Isaac; Office Action for Canadian patent application No. 3,095,465, filed Dec. 20, 2016, dated Nov. 8, 2021, 4 pgs.
Gibson, Daryl Lee; Corrected Notice of Allowance for U.S. Appl. No. 15/255,795, filed Sep. 2, 2016, dated Mar. 21, 2019, 6 pgs.
Gibson, Daryl Lee; Final Office Action for U.S. Appl. No. 15/255,795, filed Sep. 2, 2016, dated Aug. 31, 2018, 33 pgs.
Gibson, Daryl Lee; Non-Final Office Action for U.S. Appl. No. 15/255,795, filed Sep. 2, 2016, dated Feb. 23, 2018, 86 pgs.
Gibson, Daryl Lee; Notice of Allowance for U.S. Appl. No. 15/255,795, filed Sep. 2, 2016, dated Jan. 17, 2019, 17 pgs.
Gibson, Daryl Lee; Final Office Action for U.S. Appl. No. 16/352,045, filed Mar. 13, 2019, dated May 4, 2021, 33 pgs.
Gibson, Daryl Lee; Non-Final Office Action for U.S. Appl. No. 16/352,045, filed Mar. 13, 2019, dated Nov. 25, 2020, 106 pgs.
Gibson, Daryl Lee; Non-Final Office Action for U.S. Appl. No. 16/352,045, filed Mar. 13, 2019, dated Aug. 13, 2021, 20 pgs.
Gibson, Daryl Lee; Notice of Allowance for U.S. Appl. No. 16/352,045, filed Mar. 13, 2019, dated Dec. 1, 2021, 24 pgs.
Gibson, Daryl Lee; Applicant-Initiated Interview Summary for U.S. Appl. No. 16/234,715, filed Dec. 28, 2018, dated Oct. 14, 2021, 2 pgs.
Gibson, Daryl Lee; Final Office Action for U.S. Appl. No. 16/234,715, filed Dec. 28, 2018, dated Aug. 5, 2021, 21 pgs.
Gibson, Daryl Lee; Non-Final Office Action for U.S. Appl. No. 16/234,715, filed Dec. 28, 2018, dated Jan. 1, 2021, 105 pgs.
Gibson, Daryl Lee; Notice of Allowance for U.S. Appl. No. 16/234,715, filed Dec. 28, 2018, dated Dec. 7, 2021, 23 pgs.
Gibson, Daryl Lee; Corrected Notice of Allowance for U.S. Appl. No. 16/121,136, filed Sep. 4, 2018, dated Nov. 9, 2020, 6 pgs.
Gibson, Daryl Lee; Non-Final Office Action for U.S. Appl. No. 16/121,136, filed Sep. 4, 2018, dated Jun. 22, 2020, 94 pgs.
Gibson, Daryl Lee; Notice of Allowance for U.S. Appl. No. 16/121,136, filed Sep. 4, 2018, dated Sep. 29, 2020, 15 pgs.
Gibson, Daryl Lee; Requirement for Restriction/Election for U.S. Appl. No. 16/121,136, filed Sep. 14, 2018, dated May 7, 2020, 5 pgs.
Gibson, Daryl Lee; Applicant-Initiated Interview Summary for U.S. Appl. No. 17/079,642, filed Oct. 26, 2020, dated Feb. 9, 2022, 2 pgs.
Gibson, Daryl Lee; Final Office Action for U.S. Appl. No. 17/079,642, filed Oct. 26, 2020, dated Dec. 14, 2021, 17 pgs.
Gibson, Daryl Lee; Non-Final Office Action for U.S. Appl. No. 17/079,642, filed Oct. 26, 2020, dated Aug. 30, 2021, 84 pgs.
Gibson, Daryl Lee; Notice of Allowance for U.S. Appl. No. 17/079,642, filed Oct. 26, 2020, dated Mar. 1, 2022, 11 pgs.
ABT, Inc., Installation Instructions Belleville Washer springs (Year: 2014).
Gibson, Daryl Lee; Non-Final Office Action for U.S. Appl. No. 16/428,744, filed May 31, 2019, dated Aug. 2, 2021, 121 pgs.
Gibson, Daryl Lee; Notice of Allowance for U.S. Appl. No. 16/428,744, filed May 31, 2019, dated Mar. 16, 2022, 34 pgs.
QRFS, Storz FDCs and fire Hydrant Storz connections: Adapters or integral Storz, Mar. 2019 (Year: 2019).
Speacialinsert, Inserts for plastic (Year: 2016).
Gibson, Daryl Lee; Applicant-Initiated Interview Summary for U.S. Appl. No. 17/245,419, filed Apr. 30, 2021, dated Dec. 2, 2021, 2 pgs.
Gibson, Daryl Lee; Applicant-Initiated Interview Summary for U.S. Appl. No. 17/245,419, filed Apr. 30, 2021, dated Mar. 8, 2022, 2 pgs.
Gibson, Daryl Lee; Final Office Action for U.S. Appl. No. 17/245,419, filed Apr. 30, 2021, dated Oct. 25, 2021, 27 pgs.
Gibson, Daryl Lee; Final Office Action for U.S. Appl. No. 17/245,419, filed Apr. 30, 2021, dated Apr. 8, 2022, 31 pgs.
Gibson, Daryl Lee; Non-Final Office Action for U.S. Appl. No. 17/245,419, filed Apr. 30, 2021, dated Jan. 14, 2022, 27 pgs.
Gibson, Daryl Lee; Non-Final Office Action for U.S. Appl. No. 17/245,419, filed Apr. 30, 2021, dated Jul. 20, 2022, 37 pgs.
Gibson, Daryl Lee; Non-Final Office Action for U.S. Appl. No. 17/245,419, filed Apr. 30, 2021, dated Sep. 2, 2021, 82 pgs.
Gibson, Daryl Lee; International Preliminary Reporton Patentability for PCT Application No. PCT/US2016/067692, filed Dec. 20, 2016, dated Aug. 23, 2018, 9 pgs.
Gibson, Daryl Lee; International Search Report and Written Opinion for PCT Application No. PCT/US2016/067692, filed Dec. 20, 2016, dated Mar. 2, 2017, 10 pgs.
Gibson, Daryl Lee; Extended European Search Report for 16890115.5, filed Dec. 20, 2016, dated Jan. 24, 2020, 10 pgs.
Gibson, Daryl Lee; Office Action for Canadian patent application No. 3,010,345, filed Dec. 20, 2016, dated Oct. 6, 2020, 4 pgs.
Gibson, Daryl Lee; Office Action for Canadian patent application No. 3,010,345, filed Dec. 20, 2016, dated Dec. 16, 2019, 4 pgs.
Gibson, Daryl Lee; Office Action for Canadian patent application No. 3,057,224, filed Oct. 1, 2019, dated Nov. 10, 2020, 4 pgs.
Gibson, Daryl; Office Action for Canadian patent application No. 3,057,224, filed Oct. 1, 2019, dated Jun. 23, 2021, 4 pgs.
Gibson, Daryl Lee; International Preliminary Reporton Patentability for PCT Application No. PCT/US19/45451, filed Aug. 7, 2019, dated Mar. 18, 2021, 8 pgs.
Gibson, Daryl Lee; International Search Report and Written Opinion for PCT Application No. PCT/US19/45451, filed Aug. 7, 2019, dated Feb. 3, 2020, 11 pgs.
Gibson, Daryl Lee; Invitation to Pay Additional Fees for PCT/US19/45451, filed Aug. 7, 2019, dated Oct. 10, 2019, 2 pgs.
Gibson, Daryl Lee; Office Action for Canadian patent application No. 3,057,167, filed Aug. 7, 2019, dated Nov. 19, 2019, 7 pgs.
Gibson, Daryl Lee; Office Action for Canadian patent application No. 3,057,167, filed Aug. 7, 2019, dated May 25, 2020, 3 pgs.
Gibson, Daryl Lee; Office Action for Canadian patent application No. 3,105,683, filed Aug. 7, 2019, dated Mar. 8, 2022, 4 pgs.
Gibson, Daryl Lee; Extended European Search Report for application No. 19857477.4, filed Aug. 7, 2019, dated Jan. 5, 2022, 7 pgs.
Hyland, Gregory E.; Office Action for European patent application No. 11796120.1, filed May 5, 2011, dated Feb. 9, 2018, 4 pgs.
Hyland, Gregory; Extended European Search Report for serial No. 11796120.1, filed May 5, 2011, dated Nov. 4, 2016, 8 pgs.
Hyland, Gregory E.; Australian Patent Examination Report for serial No. 2011265675, filed Jan. 21, 2012, dated Oct. 1, 2014, 3 pgs.
Hyland, Gregory E.; Japanese Office Action for serial No. 2013515338, filed Jan. 30, 2012, dated Jun. 10, 2014, 8 pgs.
Hyland, Gregory E.; Japanese Office Action for serial No. 2014-234642, filed May 5, 2011, dated Nov. 4, 2015, 9 pgs.

(56) References Cited

OTHER PUBLICATIONS

Hyland, Gregory E.; Japanese Office Action for serial No. 2014-234642, filed May 5, 2011, dated Jul. 7, 2015, 9 pgs.
Hyland, Gregory E.; Australian Examination Report for serial No. 2015202550, filed May 5, 2011, dated Feb. 9, 2017, 4 pgs.
Hyland, Gregory E.; Australian Examination Report for Serial No. 2015202550, filed May 5, 2011, dated May 16, 2017, 5 pgs.
Hyland, Gregory E.; Australian Examination Report for Serial No. 2015202550, filed May 5, 2011, dated Jul. 5, 2017, 4 pgs.
Hyland, Gregory E.; Australian Examination Report for serial No. 2015202550, filed May 5, 2011, dated Aug. 12, 2016, 4 pgs.
Hyland, Gregory E.; Office Action for Mexico Patent Application No. MX/a/2017/006090, filed May 5, 2011, dated Sep. 26, 2018, 4 pgs.
Hyland, Gregory E.; Examination Report for Australian patent application No. 2017248541, filed Oct. 20, 2017, dated Apr. 20, 2018, 5 pgs.
Hyland, Gregory E.; Office Action for Canadian patent application No. 3,023,529, filed May 5, 2011, dated Nov. 26, 2019, 4 pgs.
Keefe, Robert Paul, Office Action for Canadian application No. 3,060,512, filed May 5, 2011, dated Apr. 22, 2020, 5 pgs.
Keefe, Robert Paul, Office Action for Canadian application No. 3,060,512, filed May 5, 2011, dated Jul. 13, 2020, 6 pgs.
Fleury, Leo W.; International Preliminary Report on Patentability for serial No. PCT/US12/50390 filed Aug. 10, 2012, dated Feb. 18, 2014, 14 pgs.
Fleury, Leo W.; International Search Report and Written Opinion for serial No. PCT/US 12/50390 filed Aug. 10, 2012, dated Dec. 17, 2012, 18 pgs.
Fleury Jr., Leo W.; European Search Report for U.S. Appl. No. 12/823,594, filed Aug. 10, 2012, dated Dec. 21, 2017, 4 pgs.
Fleury Jr., Leo W.; European Search Report for U.S. Appl. No. 12/823,594, filed Aug. 10, 2012, dated May 10, 2017, 4 pgs.
Fleury Jr., Leo W.; European Search Report for U.S. Appl. No. 12/823,594, filed Aug. 10, 2012, dated Jun. 8, 2015, 11 pgs.
Fleury, Leo W.; Office Action for Canadian application No. 2,842,042, filed Aug. 10, 2012, dated Feb. 28, 2019, 3 pgs.
Fleury, Leo W.; Office Action for Canadian application No. 2,842,042, filed Aug. 10, 2012, dated Apr. 24, 2018, 3 pgs.
Fleury, Leo W.; Office Action for Canadian patent application No. 2,842,042, filed Aug. 10, 2012, dated 12/5/82019, 3 pgs.
Fleury, Leo W., Jr.; Office Action for Canadian patent application No. 3,102,529, filed Aug. 10, 2012, dated Mar. 16, 2022, 4 pgs.
Fleury, Leo W., U.S. Provisional Patent Application Entitled: Hydrant Leak Detector Communication Device, System, and Method under U.S. Appl. No. 61/523,274, filed Aug. 12, 2011; 35 pgs.
Hunaidi, Osama; Issue Notification for U.S. Appl. No. 11/766,288, filed Jun. 21, 2007, dated Sep. 22, 2010, 1 pg.
Hunaidi, Osama; Non-Final Office Action for U.S. Appl. No. 11/766,288, filed Jun. 21, 2007, dated Jan. 20, 2010, 50 pgs.
Hunaidi, Osama; Notice of Allowance for U.S. Appl. No. 11/766,288, filed Jun. 21, 2007, dated Jun. 24, 2010, 8 pgs.
Hunaidi, Osama; Non-final Office Action for U.S. Appl. No. 09/482,317, filed Jan. 14, 2000, dated Dec. 17, 2001, 6 pgs.
Hunaidi, Osama; Notice of Allowance for U.S. Appl. No. 09/482,317, filed Jan. 14, 2000, dated May 13, 2002, 4 pgs.
Pei Er, Russo Anthony; European Search Report for Patent Application No. EP95307807, filed Nov. 1, 1995, dated Jul. 22, 1998, 5 pgs.
Ortiz, Jorge Isaac; Final Office Action for U.S. Appl. No. 15/043,057, filed Feb. 12, 2016, dated Dec. 12, 2018, 25 pgs.
Ortiz, Jorge Isaac; Issue Notification for U.S. Appl. No. 15/043,057, filed Feb. 12, 2016, dated Apr. 17, 2019, 1 pg.
Ortiz, Jorge Isaac; Non-Final Office Action for U.S. Appl. No. 15/043,057, filed Feb. 12, 2016, dated Jun. 4, 2018, 94 pgs.
Ortiz, Jorge Isaac; Notice of Allowance for U.S. Appl. No. 15/043,057, filed Feb. 12, 2016, dated Feb. 19, 2019, 8 pgs.
Ortiz, Jorge Isaac; Supplemental Notice of Allowance for U.S. Appl. No. 15/043,057, filed Feb. 12, 2016, dated Mar. 13, 2019, 6 pgs.
Ortiz, Jorge Isaac, Notice of Allowance for U.S. Appl. No. 16/354,939, filed Mar. 15, 2019, dated Jun. 9, 2022, 10 pgs.
Ortiz, Jorge Isaac; Final Office Action for U.S. Appl. No. 16/354,939, filed Mar. 15, 2019, dated Mar. 17, 2022, 40 pgs.
Ortiz, Jorge Isaac; Non-Final Office Action for U.S. Appl. No. 16/354,939, filed Mar. 15, 2019, dated Aug. 10, 2021, 126 pgs.
Ortiz, Jorge Isaac; Final Office Action for U.S. Appl. No. 17/245,181, filed Apr. 30, 2021, dated Dec. 7, 2021, 28 pgs.
Ortiz, Jorge Isaac; Non-Final Office Action for U.S. Appl. No. 17/245,181, filed Apr. 30, 2021, dated Sep. 16, 2021, 82 pgs.
Ortiz, Jorge Isaac; Notice of Allowance for U.S. Appl. No. 17/245,181, filed Apr. 30, 2021, dated Mar. 7, 2022, 13 pgs.
Ortiz, Jorge Isaac; Requirement for Restriction/Election for U.S. Appl. No. 17/245,181, filed Apr. 30, 2021, dated Jul. 22, 2021, 6 pgs.
Sansei Denki KK; Translation for JP3595856(B2), published on Dec. 2, 2004, 12 pgs.
Wallace & Tiernan; Brochure for Hydraclam continuous water quality monitoring via hydrants, Allegedly Available as Early as 2008, 3 pgs.
Wallace & Tiernan; Brochure for HYDRACLAM Distribution Water Quality Monitoring SB.50.700GE, Allegedly Available as Early as 2008, 8 pgs.
Wallace & Tiernan; Product Sheet for Wallace & Tiernan Analysers and Controllers-HydraClam Water Quality Monitor with Remote Communications, Allegedly Available as Early as 2008, 4 pgs.
Ortiz, Jorge Isaac; International Preliminary Reporton Patentability for PCT Application No. PCT/US2016/067689, filed Dec. 20, 2016, dated Aug. 23, 2018, 8 pgs.
Ortiz, Jorge; International Search Report and Written Opinion for PCT/US16/67689, filed Dec. 20, 2016, dated Mar. 8, 2017, 9 pgs.
Ortiz, Jorge Isaac; Extended European Search Report for serial No. 16890114.8, filed Dec. 20, 2016, dated Sep. 26, 2019, 11 pgs.
Gibson, Daryl Lee; Extended European Search Report for application No. 21180958.7, filed Aug. 7, 2019, dated Oct. 5, 2021, 8 pgs.
Gibson, Daryl Lee; Office Action for Canadian application No. 3,057,202, filed Oct. 1, 2019, dated Dec. 19, 2019, 3 pgs.
Gibson, Daryl Lee; Office Action for Canadian application No. 3,057,202, filed Oct. 1, 2019, dated Apr. 2, 2020, 4 pgs.
Gibson, Daryl Lee; Office Action for Canadian application No. 3,057,202, filed Oct. 1, 2019, dated Aug. 31, 2020, 4 pgs.
Gibson, Daryl Lee; Office Action for Canadian patent application No. 3,113,517, filed Oct. 1, 2019, dated Jul. 8, 2022, 5 pgs.
Gibson, Daryl Lee; U.S. Provisional Application entitled: Nozzle Cap Multi-Band Antenna Assembly having U.S. Appl. No. 62/294,973, filed Feb. 12, 2016, 54 pgs.
Gibson, Daryl Lee; Non-Final Office Action for U.S. Appl. No. 16/874,340, filed May 14, 2020, dated May 27, 2022, 126 pgs.
Gibson, Daryl Lee; International Search Report and Written Opinion for PCT Application No. PCT/US21/31033, filed May 6, 2021, dated Sep. 24, 2021, 12 pgs.
Gibson, Daryl Lee; Invitation to Pay Additional Fees for PCT/US21/31033, filed May 6, 2021, dated Jul. 15, 2021, 2 pgs.
Antenna. Merriam-Webster Dictionary, 2014 [retrieved on Jun. 1, 2014]. Retrieved from the Internet: <URL: www.merriam-webster.com/dictionary/antenna>.
Fleury, et al.; Supplemental European Search Report for application No. 12823594.2, filed Aug. 20, 2012, dated Feb. 18, 2015, 6 pgs.
J.A. Gallego-Juarez, G. Rodriguez-Corral and L. Gaete-Garreton, An ultrasonic transducer for high power applications in gases, Nov. 1978, Ultrasonics, published by IPC Business Press, p. 267-271.
Non-Patent Literature "Radiodetection Water Leak Detection Products", 2008, Radiodetection Ltd.—SPX Corporation.
Non-Patent Literature Bimorph (entitled "Bimoprh actuators"), accessed at http://web.archive.org/web/20080122050424/http://www.elpapiezo.ru/eng/curve_e.shtml, archived on Jan. 22, 2008.
Non-Patent Literature Murata (entitled "Piezoelectric Sounds Components"), accessed at http://web.archive.org/web/20030806141815/http://www.murata.com/catalog/p37e17.pdf, archived on Aug. 6, 2003.
Non-Patent Literature NerdKits, accessed at http://web.archive.org/web/20090510051850/http://www.nerdkits.com/videos/sound_meter/, archived on May 10, 2009.

(56) References Cited

OTHER PUBLICATIONS

Fleury, Jr., Leo W.; Non-Final Office Action for U.S. Appl. No. 15/939,942, filed Mar. 29, 2018, dated Mar. 24, 2021, 32 pgs.
Fleury, Jr., Leo W.; Non-Final Office Action for U.S. Appl. No. 15/939,942, filed Mar. 29, 2018, dated May 27, 2020, 23 pgs.
Fleury, Jr., Leo W.; Non-Final Office Action for U.S. Appl. No. 15/939,942, filed Mar. 29, 2018, dated Sep. 25, 2019, 92 pgs.
Fleury,Jr., Leo W.; Final Office Action for U.S Appl. No. 15/939,942, filed Mar. 29, 2018, dated Aug. 27, 2021, 30 pgs.
Richarz, Werner Guenther; Corrected Notice of Allowability for U.S. Appl. No. 13/492,792, filed Jun. 8, 2012, dated Aug. 29, 2017, 6 pgs.
Richarz, Werner Guenther; Final Office Action for U.S. Appl. No. 13/492,792, filed Jun. 8, 2012, dated Oct. 20, 2014, 17 pgs.
Richarz, Werner Guenther; Final Office Action for U.S. Appl. No. 13/492,792, filed Jun. 8, 2012, dated Sep. 10, 2015, 20 pgs.
Richarz, Werner Guenther; Final Office Action for U.S. Appl. No. 13/492,792, filed Jun. 8, 2012, dated Sep. 8, 2016, 36 pgs.
Richarz, Werner Guenther; Issue Notification for U.S. Appl. No. 13/492,792, filed Jun. 8, 2012, dated Sep. 6, 2017, 1 pg.
Richarz, Werner Guenther; Non-Final Office Action for U.S. Appl. No. 13/492,792, filed Jun. 8, 2012, dated Nov. 6, 2013, 39 pgs.
Richarz, Werner Guenther; Non-Final Office Action for U.S. Appl. No. 13/492,792, filed Jun. 8, 2012, dated Jun. 4, 2014, 24 pgs.
Richarz, Werner Guenther; Non-Final Office Action for U.S. Appl. No. 13/492,792, filed Jun. 8, 2012, dated Feb. 27, 2015, 15 pgs.
Richarz, Werner Guenther; Non-Final Office Action for U.S. Appl. No. 13/492,792, filed Jun. 8, 2012, dated Mar. 8, 2016, 27 pgs.
Richarz, Werner Guenther; Notice of Allowance for U.S. Appl. No. 13/492,792, filed Jun. 8, 2012, dated Jun. 13, 2017, 31 pgs.
Richarz, Werner Guenther; Restriction Requirement for U.S. Appl. No. 13/492,792, filed Jun. 8, 2012, dated Sep. 27, 2013; 5 pgs.
Chou, et al.; Article entitled: "Non-invasive Acceleration-based Methodology for Damage Detection and Assessment of Water Distribution System", Mar. 2010, 17 pgs.
Dintakurti, Ganapathi Deva Varma; Corrected Notice of Allowance for U.S. Appl. No. 13/492,794, filed Jun. 8, 2012, dated Dec. 6, 2018, 6 pgs.
Dintakurti, Ganapathi Deva Varma; Final Office Action for U.S. Appl. No. 13/492,794, filed Jun. 8, 2012, dated Oct. 18, 2017, 38 pgs.
Dintakurti, Ganapathi Deva Varma; Final Office Action for U.S. Appl. No. 13/492,794, filed Jun. 8, 2012, dated Nov. 8, 2016, 31 pgs.
Dintakurti, Ganapathi Deva Varma; Final Office Action for U.S. Appl. No. 13/492,794, filed Jun. 8, 2012, dated Jun. 22, 2018, 39 pgs.
Dintakurti, Ganapathi Deva Varma; Issue Notification for U.S. Appl. No. 13/492,794, filed Jun. 8, 2012, dated Dec. 19, 2018, 1 pg.
Dintakurti, Ganapathi Deva Varma; Non-Final Office Action for U.S. Appl. No. 13/492,794, filed Jun. 8, 2012, dated Mar. 16, 2017, 30 pgs.
Dintakurti, Ganapathi Deva Varma; Non-Final Office Action for U.S. Appl. No. 13/492,794, filed Jun. 8, 2012, dated May 17, 2016, 48 pgs.
Dintakurti, Ganapathi Deva Varma; Non-Final Office Action for U.S. Appl. No. 13/492,794, filed Jun. 8, 2012, dated Jan. 11, 2018, 38 pgs.
Dintakurti, Ganapathi Deva Varma; Non-Final Office Action for U.S. Appl. No. 13/492,794, filed Jun. 8, 2012, dated Jan. 16, 2015, 60 pgs.
Dintakurti, Ganapathi Deva Varma; Notice of Allowance for U.S. Appl. No. 13/492,794, filed Jun. 8, 2012 dated Sep. 24, 2018, 21 pgs.
Fleury Jr, Leo W.; Non-Final Office Action for U.S. Appl. No. 13/492,795, filed Jun. 8, 2012, dated Sep. 23, 2013 35 pgs.
Fleury, Jr., Leo W.; Advisory Action for U.S. Appl. No. 13/492,795, filed Jun. 8, 2012, dated Jun. 18, 2014, 4 pgs.
Fleury, Jr., Leo W.; Advisory Action for U.S. Appl. No. 13/492,795, filed Jun. 8, 2012, dated Sep. 9, 2015, 3 pgs.
Fleury, Jr., Leo W.; Corrected Notice of Allowability for U.S. Appl. No. 13/492,795, filed Jun. 8, 2012, dated Feb. 14, 2017; 8 pgs.
Fleury, Jr., Leo W.; Final Office Action for U.S. Appl. No. 13/492,795, filed Jun. 8, 2012, dated Apr. 23, 2014, 19 pgs.
Fleury, Jr., Leo W.; Final Office Action for U.S. Appl. No. 13/492,795, filed Jun. 8, 2012, dated May 22, 2015, 28 pgs.
Fleury, Jr., Leo W.; Issue Notification for U.S. Appl. No. 13/492,795, filed Jun. 8, 2012, dated Feb. 22, 2017; 1 page.
Fleury, Jr., Leo W.; Non-Final Office Action for U.S. Appl. No. 13/492,795, filed Jun. 8, 2012, dated Oct. 21, 2014, 37 pgs.
Fleury, Jr., Leo W.; Non-Final Office Action for U.S. Appl. No. 13/492,795, filed Jun. 8, 2012, dated Mar. 1, 2016, 42 pgs.
Fleury, Jr., Leo W.; Notice of Allowability for U.S. Appl. No. 13/492,795, filed Jun. 8, 2012, dated Oct. 24, 2016, 13 pgs.
Fleury, Jr., Leo W.; Notice of Allowance for U.S. Appl. No. 13/492,795, filed Jun. 8, 2012, dated Sep. 21, 2016, 18 pgs.
Fleury, Jr., Leo W.; Supplemental Notice of Allowance for U.S. Appl. No. 13/492,795, filed Jun. 8, 2012, dated Nov. 22, 2016; 8 pgs.
Fleury, Jr., Leo W.; Corrected Notice of Allowance for U.S. Appl. No. 15/401,457, filed Jan. 9, 2017, dated Jun. 26, 2019, 55 pgs.
Fleury, Jr., Leo W.; Notice of Allowance for U.S. Appl. No. 15/401,457, filed Jan. 9, 2017, dated Apr. 16, 2019, 88 pgs.
Fleury Jr., Leo W.; Final Office Action for U.S. Appl. No. 16/453,318, filed Jun. 26, 2019, dated Aug. 8, 2022, 53 pgs.
Fleury, Jr.; Non-Final Office Action for U.S. Appl. No. 16/453,318, filed Jun. 26, 2019, dated Mar. 2, 2022, 129 pgs.
Hyland; International Preliminary Report on Patentability for serial No. PCT/US2011/035374, filed May 5, 2011, dated Dec. 19, 2012; 5 pgs.
Hyland; International Search Report and Written Opinion for serial No. PCT/US2011/035374, filed May 5, 2011, dated Sep. 13, 2011; 7 pgs.
Hyland, Gregory E..; Office Action for Canadian Patent Application No. 2,766,850, filed May 5, 2011, dated Mar. 13, 2017, 4 pgs.
Hyland, Gregory E.; Office Action for Canadian application No. 2,766,850, filed May 5, 2011, dated Aug. 16, 2018, 4 pgs.
Hyland, Gregory E.; Office Action for Canadian patent application No. 2,766,850, filed May 5, 2011, dated Jun. 19, 2019, 4 pgs.
Hyland, Gregory E.; Mexico Office Action for serial No. MX/a/2012/000347, filed May 5, 2011, dated Dec. 13, 2016, 5 pgs.
Hyland, Gregory E.; Mexico Office Action for serial No. MX/a/2012/000347, filed May 5, 2011, dated May 30, 2016, 4 pgs.
Hyland, Gregory E.; Mexico Office Action for serial No. MX/a/2012/000347, filed May 5, 2011, dated Aug. 31, 2016, 4 pgs.
Hyland, Gregory E., Non-Final Office Action for U.S. Appl. No. 13/101,235, filed May 5, 2011, dated Jul. 31, 2013; 57 pgs.
Hyland, Gregory E.; Final Office Action for U.S. Appl. No. 13/101,235, filed May 5, 2011, dated Feb. 20, 2014; 29 pgs.
Hyland, Gregory E.; Issue Notification for U.S. Appl. No. 13/101,235, filed May 5, 2011, dated Dec. 23, 2014, 1 pg.
Hyland, Gregory E.; Non-Final Office Action for U.S. Appl. No. 13/101,235, filed May 5, 2011, dated Jun. 5, 2014, 29 pgs.
Hyland, Gregory E.; Notice of Allowance for U.S. Appl. No. 13/101,235, filed May 5, 2011, dated Sep. 11, 2014, 11 pgs.
Hyland, Gregory E.; Supplemental Notice of Allowability for U.S. Appl. No. 13/101,235, filed May 5, 2011, dated Nov. 25, 2014, 5 pgs.
Hyland, Gregory E.; Applicant-Initiated Interview Summary for U.S. Appl. No. 14/557,754, filed Dec. 2, 2014, dated Apr. 19, 2017, 4 pgs.
Hyland, Gregory E.; Final Office Action for U.S. Appl. No. 14/557,754, filed Dec. 2, 2014, dated Apr. 5, 2017, 23 pgs.
Hyland, Gregory E.; Final Office Action for U.S. Appl. No. 14/557,754, filed Dec. 2, 2014, dated Jun. 30, 2016, 24 pgs.
Hyland, Gregory E.; Non-Final Office Action for U.S. Appl. No. 14/557,754, filed Dec. 2, 2014, dated Jan. 19, 2016, 101 pgs.
Hyland, Gregory E.; Non-Final Office Action for U.S. Appl. No. 14/557,754, filed Dec. 2, 2014, dated Nov. 8, 2016, 48 pgs.
Hyland, Gregory E.; Notice of Allowance for U.S. Appl. No. 14/557,754, filed Dec. 2, 2014, dated Jul. 17, 2017, 14 pgs.

(56) References Cited

OTHER PUBLICATIONS

Hyland, Gregory E.; Notice of Decision from Post-Prosecution Pilot Program (P3) Conference for U.S. Appl. No. 14/557,754, filed Dec. 2, 2014, dated Sep. 14, 2016, 4 pgs.
Hyland, Gregory E.; Supplemental Notice of Allowability for U.S. Appl. No. 14/557,754, filed Dec. 2, 2014, dated Oct. 20, 2017, 11 pgs.
Hyland, Gregory; Issue Notification for U.S. Appl. No. 14/557,754, filed Dec. 2, 2014, dated Dec. 20, 2017, 1 pg.
Hyland, Gregory E.; Final Office Action for U.S. Appl. No. 14/848,676, filed Sep. 9, 2015, dated Aug. 19, 2016; 20 pgs.
Hyland, Gregory E.; Issue Notification for U.S. Appl. No. 14/848,676, filed Sep. 9, 2015, dated Dec. 6, 2017, 1 pg.
Hyland, Gregory E.; Non-Final Office Action for U.S. Appl. No. 14/848,676, filed Sep. 9, 2015, dated Dec. 13, 2016, 52 pgs.
Hyland, Gregory E.; Notice of Allowance for U.S. Appl. No. 14/848,676, filed Sep. 9, 2015, dated Sep. 6, 2017, 12 pgs.
Hyland, Gregory E.; Supplemental Notice of Allowability for U.S. Appl. No. 14/848,676, filed Sep. 9, 2015, dated Nov. 27, 2017, 6 pgs.
Hyland, Gregory E.; Supplemental Notice of Allowability for U.S. Appl. No. 14/848,676, filed Sep. 9, 2015, dated Sep. 19, 2017, 8 pgs.
Hyland, Gregory; Final Office Action for U.S. Appl. No. 14/848,676, filed Sep. 9, 2015, dated Jun. 7, 2017, 25 pgs.
Hyland, Gregory; Non-Final Office Action for U.S. Appl. No. 14/848,676, filed Sep. 9, 2015, dated Mar. 4, 2016, 94 pgs.
Hyland, Gregory E.; Final Office Action for U.S. Appl. No. 15/817,172, filed Nov. 18, 2017, dated Jun. 11, 2020, 33 pgs.
Hyland, Gregory E.; Non-Final Office Action for U.S. Appl. No. 15/817,172, filed Nov. 18, 2017, dated Dec. 17, 2019, 23 pgs.
Hyland, Gregory E.; Non-Final Office Action for U.S. Appl. No. 15/817,172, filed Nov. 18, 2017, dated Jul. 10, 2019, 74 pgs.
Hyland, Gregory E.; Notice of Allowance for U.S. Appl. No. 15/817,172, filed Nov. 18, 2017, dated Aug. 21, 2020, 9 pgs.
Hyland, Gregory E.; Supplemental Notice of Allowance for U.S. Appl. No. 15/817,172, filed Nov. 18, 2017, dated Oct. 28, 2020, 4 pgs.
Hyland, Gregory E.; Supplemental Notice of Allowance for U.S. Appl. No. 15/817,172, filed Nov. 18, 2017, dated Dec. 7, 2020, 4 pgs.
Hyland, Gregory; Supplemental Notice of Allowance for U.S. Appl. No. 15/817,172, filed Nov. 18, 2017, dated Oct. 9, 2020, 4 pgs.
Hyland, Gregory E.; Final Office Action for U.S. Appl. No. 16/675,507, filed Nov. 6, 2019, dated Jun. 26, 2020, 70 pgs.
Hyland, Gregory E.; Non-Final Office Action for U.S. Appl. No. 16/675,507, filed Nov. 6, 2019, dated Jan. 28, 2020, 18 pgs.
Hyland, Gregory E.; Notice of Allowance for U.S. Appl. No. 16/675,507, filed Nov. 6, 2019, dated Oct. 23, 2020, 16 pgs.
Hyland, Gregory E.; Supplemental Notice of Allowance for U.S. Appl. No. 16/675,507, filed Nov. 6, 2019, dated Nov. 10, 2020, 4 pgs.
Hyland, Gregory E.; Non-Final Office Action for U.S. Appl. No. 17/071,632, filed Oct. 15, 2020, dated Mar. 30, 2022, 89 pgs.
Hyland, Gregory E.; Notice of Allowance for U.S. Appl. No. 17/071,632, filed Oct. 15, 2020, dated Jun. 24, 2022, 11 pgs.
Fleury Jr., Leo W.; Non-Final Office Action for U.S. Appl. No. 13/492,790, filed Jun. 8, 2012, dated Nov. 5, 2014, 30 pgs.
Fleury, Jr., Leo W.; Advisory Action for U.S. Appl. No. 13/492,790, filed Jun. 8, 2012, dated Jul. 9, 2014, 3 pgs.
Fleury, Jr., Leo W.; Final Office Action for U.S. Appl. No. 13/492,790, filed Jun. 8, 2012, dated Mar. 12, 2014; 19 pgs.
Fleury, Jr., Leo W.; Issue Notification for U.S. Appl. No. 13/492,790, filed Jun. 8, 2012, dated Mar. 2, 2016, 1 pg.
Fleury, Jr., Leo W.; Non-Final Office Action for U.S. Appl. No. 13/492,790, filed Jun. 8, 2012, dated Sep. 12, 2013; 37 pgs.
Fleury, Jr., Leo W.; Notice of Allowance for U.S. Appl. No. 13/492,790, filed Jun. 8, 2012, dated Feb. 2, 2016, 9 pgs.
Fleury, Jr., Leo W.; Notice of Allowance for U.S. Appl. No. 13/492,790, filed Jun. 8, 2012, dated May 12, 2015, 9 pgs.

Fleury, Jr., Leo W.; Notice of Allowance for U.S. Appl. No. 13/492,790, filed Jun. 8, 2012, dated Sep. 23, 2015, 11 pgs.
Fleury, Leo W.; Applicant-Initiated Interview Summary for U.S. Appl. No. 14/870,070, filed Sep. 30, 2015, dated Feb. 28, 2018, 4 pgs.
Fleury, Leo W.; Final Office Action for U.S. Appl. No. 14/870,070, filed Sep. 30, 2015, dated Dec. 29, 2017, 24 pgs.
Fleury, Leo; Non-Final Office Action for U.S. Appl. No. 14/870,070, filed Sep. 30, 2015, dated Jun. 21, 2017, 88 pgs.
Fleury Jr., Leo W., Advisory Action for U.S. Appl. No. 15/939,942, filed Mar. 29, 2018, dated Dec. 7, 2021, 2 pgs.
Fleury, Jr., Leo W.; Final Office Action for U.S. Appl. No. 15/939,942, filed Mar. 29, 2018, dated Nov. 25, 2020, 37 pgs.
Fleury, Jr., Leo W.; Final Office Action for U.S. Appl. No. 15/939,942, filed Mar. 29, 2018, dated Feb. 19, 2020, 29 pgs.
Fleury Jr., Leo W.; Notice of Allowance for U.S. Appl. No. 16/453,318, filed Jun. 26, 2019, dated Dec. 5, 2022, 146 pgs.
Gibson, Daryl Lee; Non-Final Office Action for U.S. Appl. No. 17/683,090, filed Feb. 28, 2022, dated Dec. 13, 2022, 101 pgs.
Gibson, Daryl Lee; Requirement for Restriction/Election for U.S. Appl. No. 17/683,090, filed Feb. 28, 2022, dated Nov. 9, 2022, 5 pgs.
Gibson, Daryl Lee; Office Action for Canadian patent application No. 3,105,683, filed Aug. 7, 2019, dated Dec. 1, 2022, 3 pgs.
Gibson, Daryl Lee; International Preliminary Report on Patentability for PCT Application No. PCT/US21/31033, filed May 6, 2021, dated Nov. 24, 2022, 9 pgs.
Fleury Jr., Leo W.; Notice of Allowance for U.S. Appl. No. 16/453,318, filed Jun. 26, 2019, dated Oct. 25, 2022, 43 pgs.
Hyland, Gregory E.; Office Action for Canadian patent application No. 3,116,787, filed Apr. 29, 2020, dated Aug. 15, 2022, 4 pgs.
Fleury, Leo W., Jr.; Office Action for Canadian patent application No. 3,102,529, filed Aug. 10, 2012, dated Oct. 25, 2022, 4 pgs.
Hyland, Gregory E.; Notice of Allowance for U.S. Appl. No. 17/071,632, filed Oct. 15, 2020, dated Aug. 29, 2022, 10 pgs.
Ortiz, Jorge Isaac; Notice of Allowance for U.S. Appl. No. 16/354,939, filed Mar. 15, 2019, dated Sep. 2, 2022, 9 pgs.
Ortiz, Jorge Isaac; Notice of Allowance for U.S. Appl. No. 17/245,181, filed Apr. 30, 2021, dated Sep. 19, 2022, 11 pgs.
Ortiz, Jorge Isaac; Non-Final Office Action for U.S. Appl. No. 17/829,759, filed Jun. 1, 2022, dated Oct. 24, 2022, 92 pgs.
Gibson, Daryl Lee; Notice of Allowance for U.S. Appl. No. 16/428,744, filed May 31, 2019, dated Sep. 14, 2022, 12 pgs.
Gibson, Daryl Lee; Notice of Allowance for U.S. Appl. No. 17/245,419, filed Apr. 30, 2021, dated Nov. 4, 2022, 22 pgs.
Gibson, Daryl Lee; Office Action for Canadian patent application No. 3,119,150, filed Dec. 20, 2016, dated Sep. 15, 2022, 6 pgs.
Gibson, Daryl Lee; Supplementary Examination Written Opinion for Singapore patent application No. 11202101803V, filed Jul. 8, 2019, dated Nov. 2, 2022, 4 pgs.
Gibson, Daryl Lee; Notice of Allowance for U.S. Appl. No. 16/874,340, filed May 14, 2020, dated Sep. 12, 2022, 16 pgs.
Fleury Jr., Leo W.; Notice of Allowance for U.S. Appl. No. 17/536,292, filed Nov. 29, 2021, dated Feb. 28, 2023, 108 pgs.
Ortiz, Jorge Isaac; Notice of Allowance for U.S. Appl. No. 17/829,759, filed Jun. 1, 2022, dated Feb. 15, 2023, 17 pgs.
Gibson, Daryl Lee; Final Office Action for U.S. Appl. No. 17/683,090, filed Feb. 28, 2022, dated Mar. 8, 2023, 16 pgs.
Gibson, Daryl Lee; Notice of Allowance for U.S. Appl. No. 17/245,419, filed Apr. 30, 2021, dated Feb. 23, 2023, 15 pgs.
Gibson, Daryl Lee; Notice of Allowance for U.S. Appl. No. 17/827,468, filed May 27, 2022, dated May 15, 2023, 99 pgs.
Gibson, Daryl Lee; Extended European Search Report for application No. 23154819.9, filed Dec. 20, 2016, dated Apr. 28, 2023, 16 pgs.
Gibson, Daryl Lee; Office Action for European patent application No. 21180958.7, filed Aug. 7, 2019, dated Apr. 26, 2023, 4 pgs.
Fleury, Jr. Leo W.; Office Action for Canadian patent application No. 3,161,900, filed Aug. 10, 2012, dated Aug. 28, 2023, 3 pgs.
Fleury, Jr., Leo W.; Office Action for Canadian patent application No. 3,161,913, filed Aug. 10, 2012, dated Aug. 22, 2023, 4 pgs.
Gibson, Daryl Lee; Non-Final Office Action for U.S. Appl. No. 17/683,090, filed Feb. 28, 2022, dated Aug. 2, 2023, 23 pgs.

(56) References Cited

OTHER PUBLICATIONS

Gibson, Daryl Lee; Non-Final Office Action for U.S. Appl. No. 17/683,127, filed Feb. 28, 2022, dated Aug. 30, 2023, 121 pgs.
Gibson, Daryl Lee; Office Action for European patent application No. 19857477.4, filed Aug. 7, 2019, dated Jul. 31, 2023, 3 pgs.

* cited by examiner

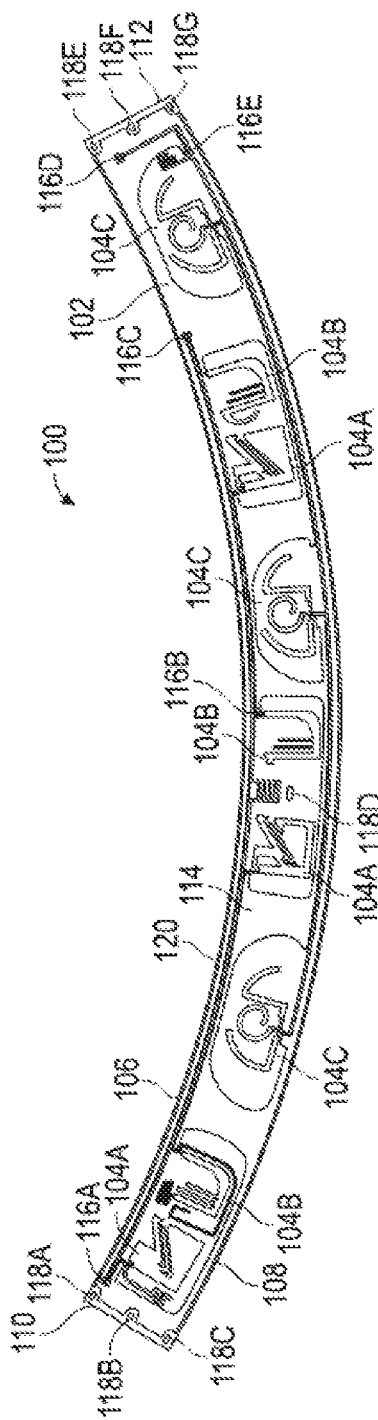
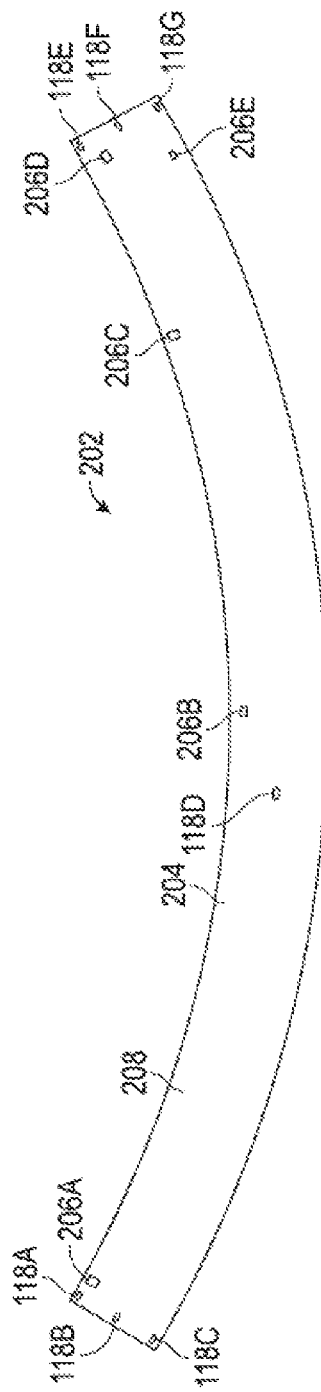

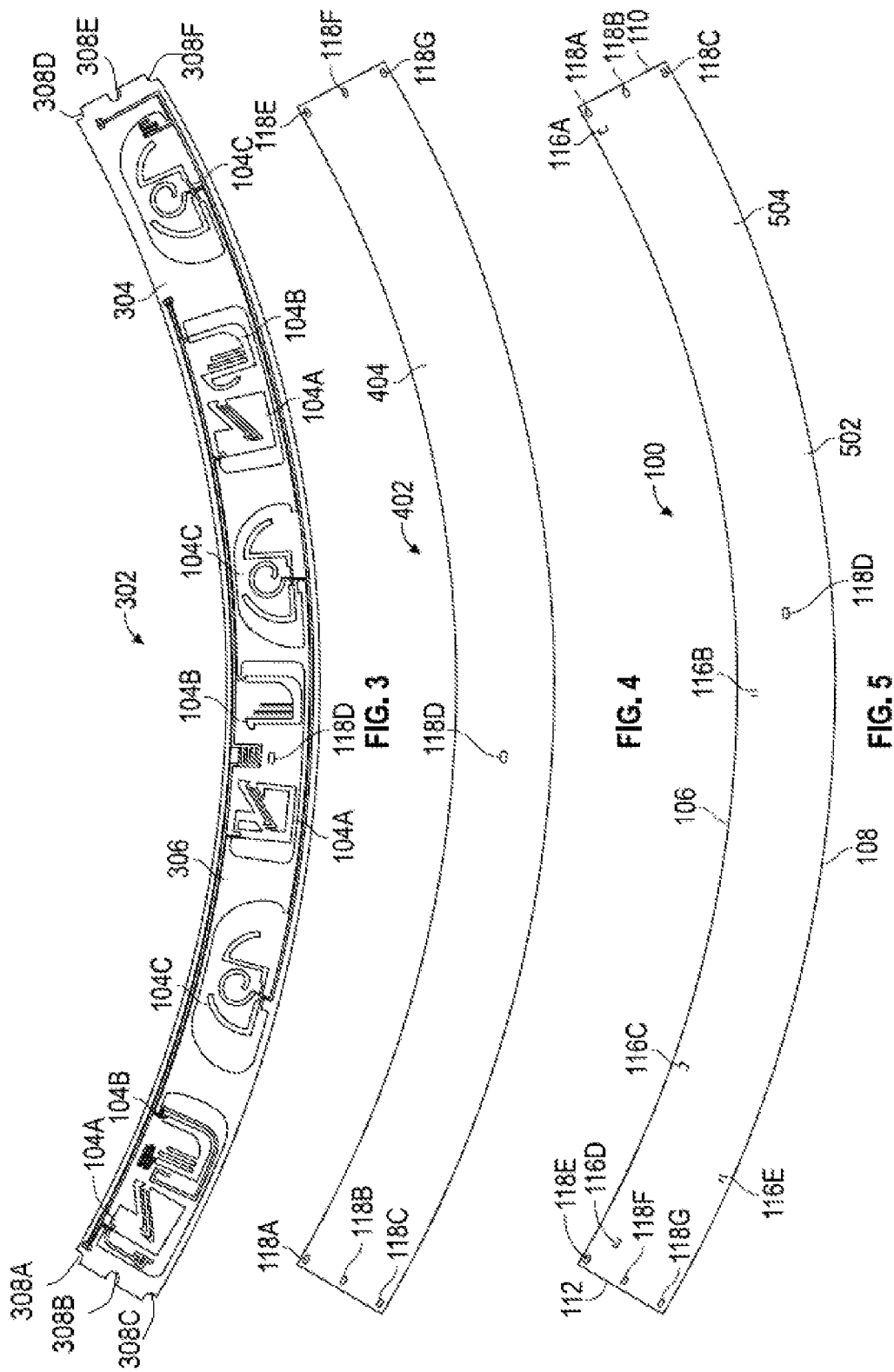

NOZZLE CAP ASSEMBLY

REFERENCE TO RELATED APPLICATION

This application is a continuation of U.S. application Ser. No. 17/245,181, filed Apr. 30, 2021, which is a continuation of U.S. application Ser. No. 16/354,939, filed Mar. 15, 2019, which is a continuation of U.S. application Ser. No. 15/043,057, filed Feb. 12, 2016, which has issued into U.S. Pat. No. 10,283,857, issued May 7, 2019, which is hereby specifically incorporated by reference herein in its entirety.

BACKGROUND

Field

This application relates to antenna assemblies for electromagnetic communication, and more particularly, to antenna assemblies for multi-band electromagnetic communication.

Background Technology

Wireless communication technology has advanced significantly over the past several years. A non-exhaustive list of examples of wireless communication systems includes radio broadcasting, television broadcasting, satellite television, two-way radio devices (e.g., CB radio, amateur radio, etc.), cellular phones, cordless phones, wireless local area networking, global positioning system (GPS) receivers, garage door openers, television remote control devices, and others. Each type of wireless communication system operates in specific frequency bands in compliance with various communication standards.

Some wireless communication devices are able to operate over two or more frequency bands to provide multiple services. However, many wireless devices operating in multiple bands include a single antenna, such that only one service can be provided at a time. Usually, conventional multi-band antennas are large and bulky, which prevents their application in many settings.

SUMMARY

Described herein is an antenna assembly. The antenna assembly is configured for use with a nozzle cap assembly. In one aspect, a nozzle cap assembly can comprise a nozzle cap comprising a base, the base defining a top end and a bottom end; and a nut positioned opposite from the bottom end; an enclosure positioned between the top end of the base and the nut, the enclosure defining a cavity within the enclosure; at least one antenna positioned within the cavity.

In a further aspect, a nozzle cap assembly can comprise a base disposed at a first end of the nozzle cap assembly, the base defining a top end and a bottom end; an enclosure mounted on the top end of the base, a cavity defined within the enclosure, at least one antenna positioned within the cavity; and a nut base disposed as a second end of the nozzle cap assembly opposite from the base, the enclosure positioned between the base and the nut base.

In a further aspect, a nozzle cap assembly can comprise a nozzle cap body defining a top end and a bottom end, the nozzle cap body defining a curved side wall extending from the top end toward the bottom end, the curved side wall defining an inner surface and an outer surface; an antenna cover covering at least a portion of the curved side wall, the antenna cover defining an inner cover surface and an outer cover surface, the inner cover surface and the outer surface of the curved side wall at least partially defining a cavity; and an antenna assembly positioned within the cavity, the antenna assembly secured to the inner cover surface.

In a further aspect, a nozzle cap assembly can comprise a body with a first curved side wall, the body defining a top end and a bottom end positioned opposite from the top end; a nut, the top end of the body positioned between the nut and the bottom end of the body; a spacer comprising a hollow body, the hollow body defining a curved outer surface, the spacer positioned between the nut and the bottom end of the body; and an antenna assembly coupled to the curved outer surface.

In a further aspect, a nozzle cap assembly can comprise a nozzle cap body defining a top end and a bottom end, the nozzle cap body defining a base positioned at the top end and a curved side wall extend from the base down to the bottom end; an enclosure coupled to the top end, the enclosure at least partially defining an enclosure cavity; an antenna assembly mounted to the enclosure; and a nut base positioned opposite from the nozzle cap body, the enclosure and the antenna assembly positioned between the nut base and the base.

In a further aspect, a method for detecting a leak in a pipeline connected to a fire hydrant, the method can comprise securing a nozzle cap assembly to a nozzle of the fire hydrant, the nozzle cap assembly comprising a nozzle cap body defining a top end and a bottom end, the nozzle cap body defining a base positioned at the top end and a curved side wall extend from the base down to the bottom end, a nozzle cavity extending into the nozzle cap body from the bottom end towards the base, the nozzle cavity receiving the nozzle; an enclosure coupled to the top end, the enclosure at least partially defining an enclosure cavity; an antenna assembly mounted to the enclosure; a vibration sensor coupled in electrical communication with the antenna assembly; and a nut base positioned opposite from the nozzle cap body, the enclosure and the antenna assembly positioned between the nut base and the base; and detecting a vibration travelling through the fire hydrant with the vibration sensor, the vibration caused by the leak in the pipeline.

In a further aspect, a nozzle cap assembly can comprise a body defining a top end and a bottom end, the body defining internal threading extending into the bottom end; a nut; a spacer at least partially defining a cavity, the spacer positioned at least partially between the nut and the bottom end; and a printed circuit board wrapping at least partially around a curved outer surface, the curved outer surface defined by at least a one of the body, the nut, and the spacer, the printed circuit board comprising at least one antenna structure.

In a further aspect, a nozzle cap assembly can comprise: a nozzle cap body defining a top end and a bottom end, the nozzle cap body defining a base positioned at the top end and a curved side wall extend from the base down to the bottom end; an enclosure coupled to the top end, the enclosure rotationally fixed relative to the nozzle cap body, the enclosure at least partially defining an enclosure cavity; and a nut base positioned opposite from the nozzle cap body, the enclosure positioned between the nut base and the base.

In a further aspect, a method for detecting a leak in a pipeline connected to a fire hydrant, the method can comprise: securing a nozzle cap assembly to a nozzle of the fire hydrant, the nozzle cap assembly comprising: a nozzle cap body defining a top end and a bottom end, the nozzle cap body defining a base positioned at the top end and a curved side wall extend from the base down to the bottom end, a nozzle cavity extending into the nozzle cap body from the bottom end towards the base, the nozzle cap body defining internal threading within the nozzle cavity, the nozzle cavity receiving the nozzle; an enclosure coupled to the top end, the enclosure rotationally fixed relative to the nozzle cap body, the enclosure at least partially defining an enclosure cavity; a modem, at least one power source, a printed circuit board, and a first antenna structure positioned within the enclosure cavity, the first antenna structure configured to communicate over a GPS frequency band; a vibration sensor connected in electrical communication to the printed circuit board; and a nut base positioned opposite from the nozzle cap body, the enclosure positioned between the nut base and the base; and detecting a vibration travelling through the fire hydrant with the vibration sensor.

In a further aspect, a nozzle cap assembly can comprise a nozzle cap body defining a top end and a bottom end, the nozzle cap body defining a base positioned at the top end and a curved side wall extend from the base down to the bottom end, the curved side wall at least partially defining internal threading and a bore extending from the bottom end to the base; an enclosure coupled to the top end, the enclosure rotationally fixed relative to the nozzle cap body, the enclosure rotationally fixed relative to the nozzle cap body, the enclosure at least partially defining an enclosure cavity; a nut base positioned opposite from the nozzle cap body, the enclosure positioned between the nut base and the base, the nut base rotationally fixed relative to the nozzle cap body; a first antenna structure positioned within the enclosure cavity, the first antenna structure configured to communicate over a GPS frequency band; at least one power source positioned within the enclosure cavity; a modem positioned within the enclosure cavity; and an antenna assembly comprising a second antenna structure, the antenna assembly coupled in electrical communication to the modem.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 1 is a top view of an antenna assembly according to one aspect of the present disclosure.

FIG. 2 is a top view of a base layer of the antenna assembly of FIG. 1.

FIG. 3 is a top view of a copper layer of the antenna assembly of FIG. 1.

FIG. 4 is a top view of a cover layer of the antenna assembly of FIG. 1.

FIG. 5 is a bottom view of the antenna assembly of FIG. 1.

DETAILED DESCRIPTION

Figure 6:
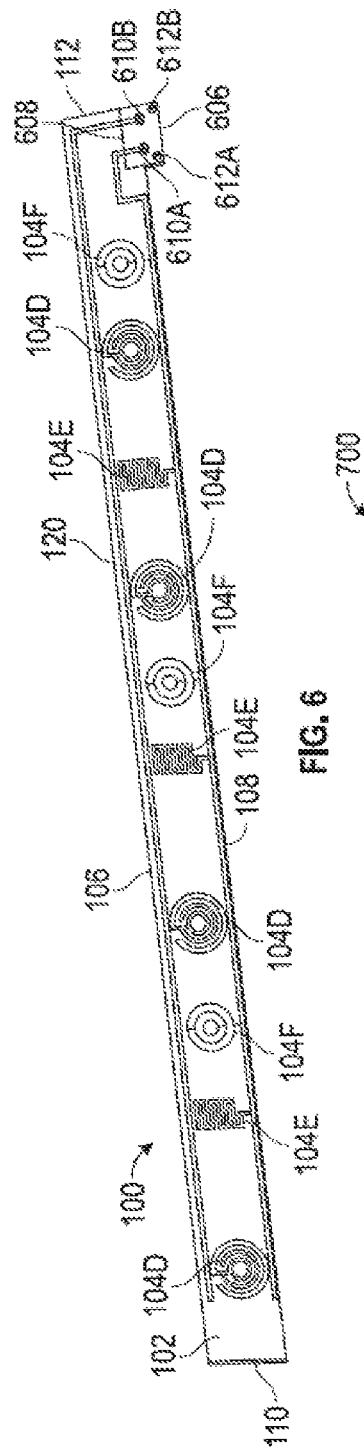
FIG. 6 is a top view of an antenna assembly according to another aspect of the present disclosure.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a band" can include two or more such bands unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or can not occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect. Directional references such as "up," "down," "top," "left," "right," "front," "back," and "corners," among others are intended to refer to the orientation as illustrated and described in the figure (or figures) to which the components and directions are referencing.

In one aspect, disclosed is an antenna assembly and associated methods, systems, devices, and various apparatus. The antenna assembly can comprise a curved printed circuit board (PCB) and a plurality of antenna structures configured to provide directional radiation in at least one frequency band. It would be understood by one of skill in the art that the disclosed antenna assembly is described in but a few exemplary aspects among many.

Figure 13:
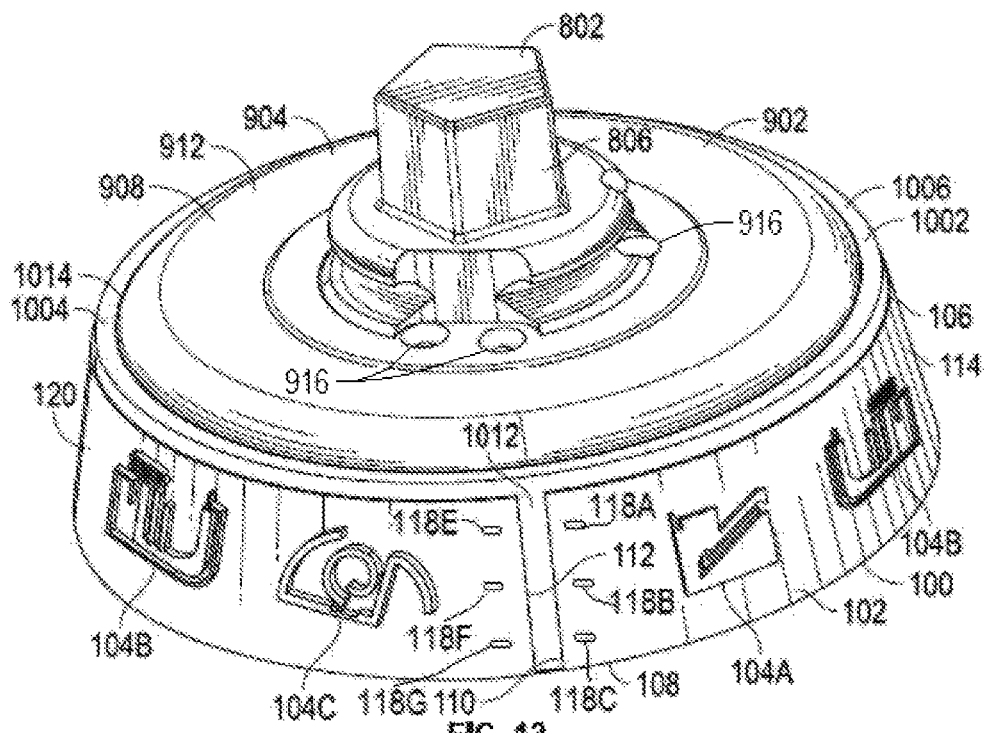
FIG. 13 is a perspective view of the antenna assembly of FIG. 1 mounted on the spacer and nozzle cap of FIG. 11.

As shown in FIG. 1, an antenna assembly 100 can comprise a PCB 102 and a plurality of antenna structures 104. In one aspect, it is contemplated that the PCB 102 can be a flexible PCB. For example and without limitation, it is contemplated that the material used to construct the PCB 102 can be selected from the group including, but not limited to, polyimide, polyethylene terephthalate (PET), and various other conventional materials used to construct flexible PCBs. In this aspect, FIG. 1 shows the PCB 102 in an unwrapped configuration. In one aspect, it is contemplated that the curved PCB 102 can be bent into a wrapped configuration, for example as shown in FIG. 13, and can be mounted or positioned around a curved surface, such as a fire hydrant, light poles, various utility structures having curved surfaces, decorative columns, curved structural supports, and various other types of structures having curved surfaces.

The PCB 102 can comprise a body 120, which can comprise a top end 106, a bottom end 108 distal from the top end 106, a first side end 110 adjacent to the top end 106 and the bottom end 108, and a second side end 112 distal from the first side end 110 and adjacent to the top end 106 and the bottom end 108. Optionally, the top end 106 and the bottom end 108 can define curved edges extending from the first side end 110 to the second side end 112. The type of edges formed by the top end 106 and the bottom end 108 should not be considered limiting on the current disclosure as it is also contemplated that the top end 106 and the bottom end 108 can define straight edges, jagged edges, and various other shapes of edges. In one aspect, the PCB 102 can comprise an outward-facing side 114 and an inward-facing side 502 (shown in FIG. 5).

As shown in FIG. 1, the antenna assembly 100 can comprise solder pads 116A-E which can be configured to be soldered to various cables (not shown), respectively, such as coaxial cables, which may be connected to various connectors or transceivers (not shown). In various other aspects, various other types of connectors can be utilized in place of the solder pads 116. It will be appreciated that the number or location of the solder pads 116 should not be considered limiting on the current disclosure as it is also contemplated that the number or location of the solder pads 116 may be varied depending on a particular use, purpose, or configuration of the antenna assembly 100. The PCB 102 can also define a number of through holes 118A-G, which may be utilized to mount various components onto the PCB 102 or secure the curved PCB 102 to various other items or devices. The number of through holes 118 should not be considered limiting on the current disclosure.

As shown in FIG. 1, in various aspects, the antenna assembly 100 can comprise two or more antenna structures 104. Optionally, the multiple antenna structures 104 are contained on a single medium, such as the PCB 102. In various aspects, the multiple antenna structures 104 can be designed or configured to operate in different frequency ranges to allow multiple types of services. An antenna assembly 100 having multiple antenna structures 104 operating in multiple frequency bands can be referred to as a "multi-band antenna assembly." Optionally, multi-band antenna assemblies can also be formed on a single PCB to allow communication in multiple frequency ranges.

In one aspect, the antenna structures 104 can be configured to provide directional radiation in at least one frequency band. Optionally, as shown in FIG. 1, the antenna structures 104 can be disposed on the outward-facing side 114 of the PCB 102. One skilled in the art will appreciate that the antenna structures 104 can be disposed on at least one of the outward-facing side 114 and the inward-facing side 502 of the PCB 102.

In the various aspects, the antenna assembly 100 can comprise: a plurality of first antenna structures 104A configured to operate within a first set of frequency bands; a plurality of second antenna structures 104B configured to operate within a second set of frequency bands; and a plurality of third antenna structures 104C configured to operate within a third set of frequency bands. It is contemplated that the antenna structures 104A-C can have various designs and configurations for operating within various frequency bands. Optionally, various other antenna structures configured to operate in additional or different sets of frequency bands can be utilized.

It will be appreciated that the number of each of the antenna structures 104A-C, respectively, should not be considered limiting on the current disclosure as it is contemplated that various combinations of antenna structures 104 may be utilized. For example and without limitation, in various aspects, the plurality of antenna structures 104 can be all first antenna structures 104A, all second antenna structures 104B, all third antenna structures 104C, all other types of antenna structures not currently shown, a combination of first antenna structures 104A and second antenna structures 104B, a combination of first antenna structures 104A and third antenna structures 104C, a combination of second antenna structures 104B and third antenna structures 104C, a combination of first antenna structures 104A and additional antenna structures configured to operate within different or additional frequency bands, etc.

In a further aspect, the antenna structures 104 can be configured to provide 360° directional radiation around a perimeter of a curved surface when the PCB 102 is mounted on the curved surface. Optionally, each one of the antenna structures 104 can be disposed on the PCB 102 such that each antenna structure provides a degreed section of radio coverage. In this aspect, the number and or type of antenna structures 104 disposed on the PCB 102 can be varied to provide different sections of radio coverage. For example and without limitation, in various aspects, the eight antenna structures 104 can be disposed and spaced on the PCB 102 where each one of the plurality of antenna structures 104 provides a 45° section of radio coverage. As another example, three antenna structures 104 can be disposed and spaced on the PCB 102 where each of the antenna structures 104 provides a 120° section of radio coverage. It is contemplated that various other sections of radio coverage can be provided by changing at least one of the number of antenna structures 104, the spacing of antenna structures 104 on the PCB 102, and the type of antenna structures 104 utilized.

In one aspect, all of the antenna structures 104 in sum can provide 360° radio coverage while each set of frequency bands covered by the antenna structures 104 may not have 360° coverage. For example and without limitation, an antenna assembly 100 comprising one first antenna structure 104A, one second antenna structure 104B, and one third antenna structure 104C, each antenna structure 104A-C can provide a 120° section of radio coverage in each of the corresponding set of frequency bands, respectively, to, in sum, provide 360° radio coverage while each set of frequency bands only has a 120° section of radio coverage.

In another aspect, each set of frequency bands covered by the antenna structures 104 may have 360° coverage around the curved surface. For example and without limitation, in an antenna assembly 100 comprising three first antenna structures 104A, three second antenna structures 104B, and three third antenna structures 104C, each antenna structure 104A-C can provide 360° radio coverage in 120° sections of radio coverage in each of the corresponding set of frequency bands, respectively. Referring to FIG. 1, in one non-limiting example, three first antenna structures 104A can be disposed on the PCB 102 to provide 360° coverage in 120° sections of radio coverage in at least one frequency band of the first set of frequency bands around the curved surface when the PCB 102 is bent. Additionally, three second antenna structures 104B can be disposed on the PCB 102 to provide 360° coverage in 120° sections of radio coverage in at least one of the second set of frequency bands around the curved surface when the PCB 102 is bent. Further, three third antenna structures 104C can be disposed on the PCB 102 to provide 360° coverage in 120° sections of radio coverage for at least one of the third set of frequency bands around the curved surface when the PCB 102 is bent.

In one preferred aspect, the antenna structures 104 can be configured to provide directional radiation in various sets of frequency bands currently developed or that may be developed in the future. For example and without limitation, the sets of frequency bands can be ranging from about 600 MHz to about 6 GHz; however, it is contemplated that the antenna structures 104 can be configured to operate at various other frequency bands below about 600 MHz or above about 6 GHz. In further aspects, the antenna structures 104 can be configured to provide radio coverage for Cellular, Cellular LTE, ISM 900, ISM 2400, GPS, and various other bands already developed or that may be developed in the future. For example and without limitation, the antenna structures can be configured to operate in various cellular bands such as 700, 800, 900, 1700, 1800, 1900, and 2100 MHz, as well as additional cellular bands currently developed or that can be developed in the future (e.g. cellular bands between 2 GHz and 6 GHz). As another example, the antenna structures 104 can be configured to operate in GPS bands, such as 1575.42 (L1) and 1227.60 MHz (L2), or in a wideband frequency range for wireless local area communication (e.g. Wi-Fi communication), such as a range from about 1.5 GHz to about 5.0 GHz, such as from about 2.0 GHz to about 5.0 GHz, any of which are currently developed bands or bands that may be developed in the future.

Referring to FIG. 1, the first antenna structures 104A can be cellular antenna structures configured to provide radio coverage for Cellular/ISM bands ranging from about 600 MHz to about 6 GHz, the second antenna structures 104B can be cellular antenna structures configured to provide radio coverage for Cellular/LTE bands ranging from about 600 MHz to about 6 GHz, and the third antenna structures 104C can be wireless local area antenna structures configured to provide radio coverage for GPS bands ranging from about 1.5 GHz to about 5.0 GHz. However, it is contemplated that the antenna structures 104A-C can provide radio coverage for various other sets of frequency bands.

Referring to FIGS. 2-4, the PCB 102 can comprise a base layer 202, a copper layer 302, and a cover layer 402. In various aspects, the antenna structures 104 can be components of the copper layer 302, which can be disposed between the base layer 202 and the cover layer 402 of the assembled PCB 102. In various aspects, an adhesive (not shown) can be utilized between the copper layer 302 and the base layer 202 and between the copper layer 302 and the cover layer 402, respectively, to attach the copper layer 302 to the base layer 202 and the cover layer 402.

Referring to FIG. 2, the base layer 202 can comprise a body 204 having an outward-facing side 208 and an inward-facing side 504 (shown in FIG. 5). In various aspects, the inward-facing side 504 can be the inward-facing side 502 of the PCB 102. In various aspects, the body 204 can define the through holes 118A-G extending through the body 204 from the outward-facing side 208 to the inward-facing side 504. The body 204 can also define solder pad holes 206A-E extending through the body 204 from the outward-facing side 208 to the inward-facing side 504. It is contemplated that the number of solder pad holes 206 defined by the body 204 can correspond with the number of solder pads 116 of the antenna assembly 100.

Referring to FIG. 3, the copper layer 302 can comprise a body 304 having an outward-facing side 306 and an inward-facing side (not shown). In various aspects, as described previously, the copper layer 302 can define the antenna structures 104. The body 404 can also define the through hole 118D. In another aspect, the copper layer 302 can define notches 308A-F. In one aspect, the notch 308A can be aligned with the through hole 118A, the notch 308B can be aligned with the through hole 118B, the notch 308C can be aligned with the through hole 118C, the notch 308D can be aligned with the through hole 118E, the notch 308E can be aligned with the through hole 118F, and the notch 308F can be aligned with the through hole 118G. One having skill in the art will appreciate that the number of notches 308 defined by the copper layer 302 should not be considered limiting on the current disclosure. In various aspects, the inward-facing side of the copper layer 302 can be positioned on the outward-facing side 208 of the base layer 202 to assemble the PCB 102.

Referring to FIG. 4, the cover layer 402 can comprise a body 404 having an outward facing side 404 and an inward-facing side (not shown). In various aspects, as shown in FIG. 4, the cover layer 402 can define the through holes 118A-G. In various aspects, the inward-facing side of the cover layer 402 can be positioned on the outward-facing side 306 of the copper layer 302 to assemble the PCB 102. In various aspects, the outward facing side 406 of the cover layer 402 can be the outward-facing side 114 of the PCB 102.

Referring to FIG. 5, portions of the solder pads 116 can extend through the PCB 102 to the inward-facing side 502.

Referring to FIG. 6, another example of the antenna assembly 100 is shown. As shown in FIG. 6, the antenna assembly 100 can comprise the antenna structures 104D-F, which can be configured to operate within different frequency bands, additional frequency bands, or the same frequency bands, respectively, as those of antenna structures 104A-C. In one aspect, the antenna assembly 100 can comprise a securing tab 606 connected to the body 120 via a bend line 608. In one aspect, the bend line 608 can be a designed weakened region at which the securing tab 606 can be bent relative to the body 120. The securing tab 606 can comprise electrical connectors 610A,B in electrical communication with the antennas 104D-F such that the antennas 104D-F can be connected to various connectors or transceivers (not shown). In various aspects, the securing tab 606 can comprise mechanical connectors or fasteners 612A,B, which can be utilized to mechanically connect or secure the antenna assembly 100 to various structures or devices. It is contemplated that the mechanical connectors or fasteners 612A,B can be, for example and without limitation, nuts and bolts, screws, pins, and various other types of connectors which can be utilized to secure the antenna assembly 100 to the various other structures or devices. It will be appreciated that the number of electrical connectors 610 or mechanical connectors 612 should not be considered limiting on the current disclosure as it is also contemplated that any desired number of electrical connectors 610 or mechanical connectors 612 can be utilized.

Figure 7:
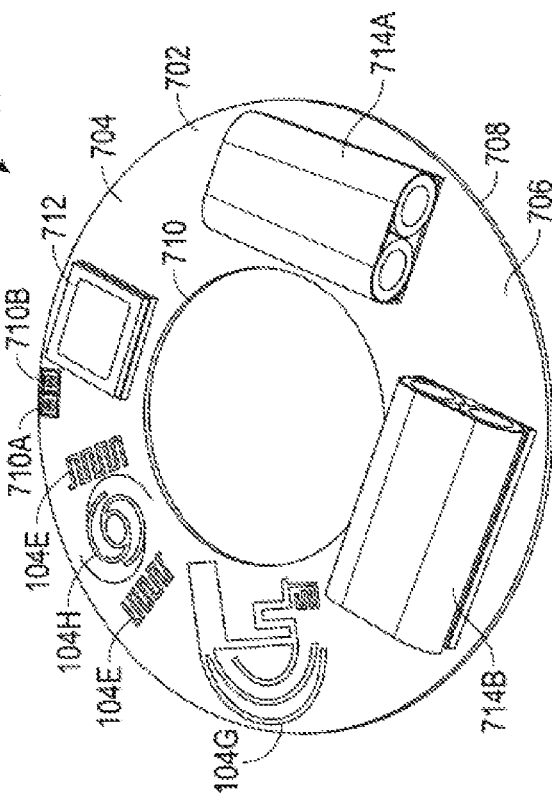
FIG. 7 is a perspective view of an antenna assembly according to another aspect of the present disclosure.

Referring to FIG. 7, another example of an antenna assembly 700 is shown. Similar to the antenna assembly 100, the antenna assembly 700 can comprise a PCB 702 and antenna structures 104. Antenna structures 104G,H can be configured to operate within different frequency bands, additional frequency bands, or the same frequency bands, respectively, as those of antenna structures 104A-E. In another aspect, as shown in FIG. 7, the antenna assembly 700 includes two antenna structures 104E.

The PCB 702 can comprise a body 704 having a top side 706 and a bottom side 708. As shown in FIG. 7, the body 704 can optionally have a substantially circular shape that defines a substantially circular-shaped bore 710. One skilled in the art will appreciate that other geometric shapes of the body 704 or the bore 710 can be present. In a further aspect, the PCB 702 can comprise electrical connectors 710A,B, which can be substantially similar to the electrical connectors 610A,B of the antenna assembly 600. In one aspect, the electrical connectors 710A,B can be connected to the antenna structures 104.

Optionally, as shown in FIG. 7, various additional structures or components can be positioned or secured to the antenna assembly 700. For example and without limitation, the additional structures or components positioned or secured to the antenna assembly 700 can be a modem 712, power supplies 714A,B such as batteries or various other power sources, sensors (not shown), or various other structures or components as desired.

Referring to FIGS. 8-13, an example of a nozzle cap assembly 800 utilizing the antenna assembly 100 is illustrated. The nozzle cap assembly 800 can comprise a nozzle cap 802, a spacer 1002 (shown in FIG. 10), the antenna assembly 100, and an antenna cover 804. The nozzle cap 802 can be configured to mount on a nozzle of a node of an infrastructure system, such as on a fire hydrant (not shown). The nozzle cap 802 can comprise attachment mechanisms, such as threading, pins, fasteners, clips, and various other types of attachment mechanisms such that the nozzle cap 802 can be removable from the fire hydrant.

Figure 9:
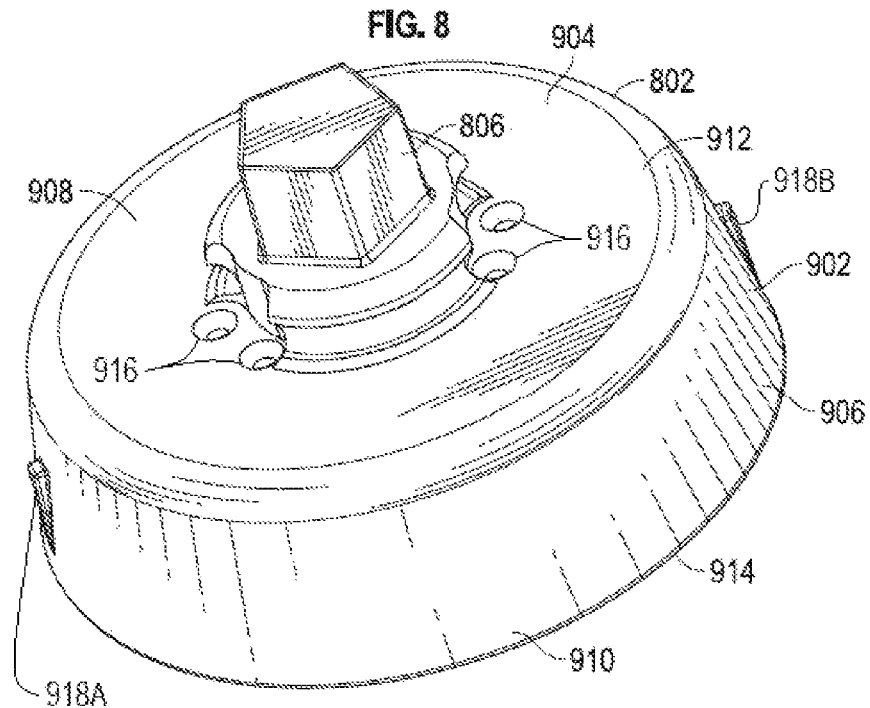
FIG. 9 is a perspective view of a nozzle cap of the nozzle cap assembly of FIG. 8.
Figure 12:
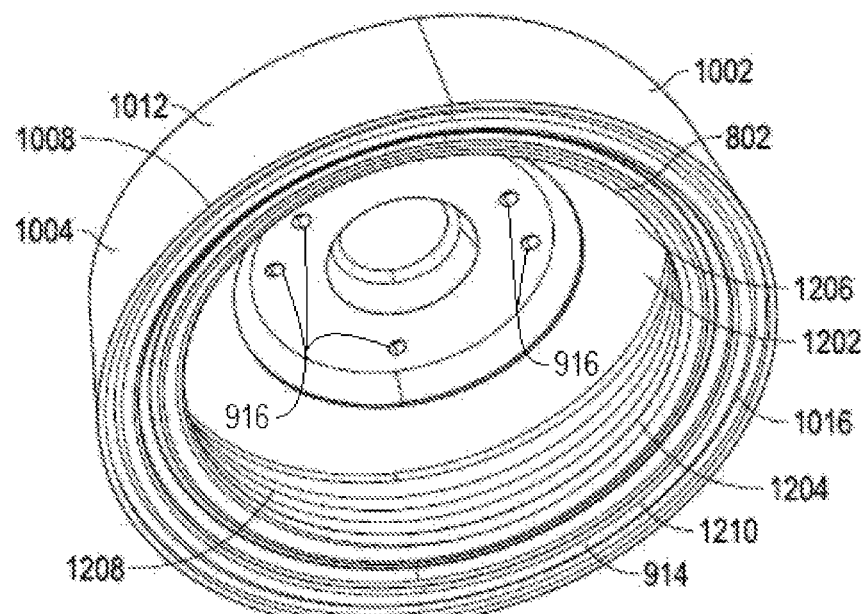
FIG. 12 is another perspective view of the assembled spacer and nozzle cap of FIG. 11.

Referring to FIG. 9, in one aspect, the nozzle cap 802 can comprise a body 902 having a top end 912 and a bottom end 914. As shown in FIG. 9, the nozzle cap 802 can comprise a base 904 at the top end 912 and a curved side wall 906 extending from the base 904 to the bottom end 914. The base 904 can have an inner surface 1202 (shown in FIG. 12) and an outer surface 908. The curved side wall 906 can have an inner surface 1204 (shown in FIG. 12) and an outer surface 910. The outer surface 910 can define spacer tabs 918A,B for attachment of the nozzle cap 802 to the spacer 1002. Two spacer tabs 918A,B are defined in FIG. 9, but any number of spacer tabs 918 can be present in other aspects. Referring to FIG. 12, the inner surface 1202 and the inner surface 1204 together can define a nozzle cap cavity 1206 having a nozzle cap cavity opening 1210 at the bottom end 914. The inner surface 1204 can define threading 1208, which can provide an attachment mechanism for the nozzle cap 802 that engages with threading on the fire hydrant such that the nozzle cap 802 may be removably attached to the fire hydrant. However, it is contemplated that various other types of attachment mechanisms other than the threading 1208 may be utilized.

The nozzle cap 802 can comprise a nut base 806 extending axially upwards from the outer surface 908 of the base 904. The nut base 806 can be utilized by an operator to aid in removing the nozzle cap 802 from the fire hydrant or securing the nozzle cap 802 to the fire hydrant. The base 904 of the nozzle cap 802 can define a plurality of cable holes 916 proximate to the nut base 806 that extend from the inner surface 1202 to the outer surface 908. Four cable holes 916 are shown in the base 904, though any number of cable holes 916 can be present in other aspects. The cable holes 916 are sized to accept one or more antenna coaxial cables connected to a radio canister (not shown) housed within the nozzle cap 802. The one or more coaxial cables extend through the cable holes 916 to connect with the antenna assembly 100 at any of the solder pads 116.

Figure 8:
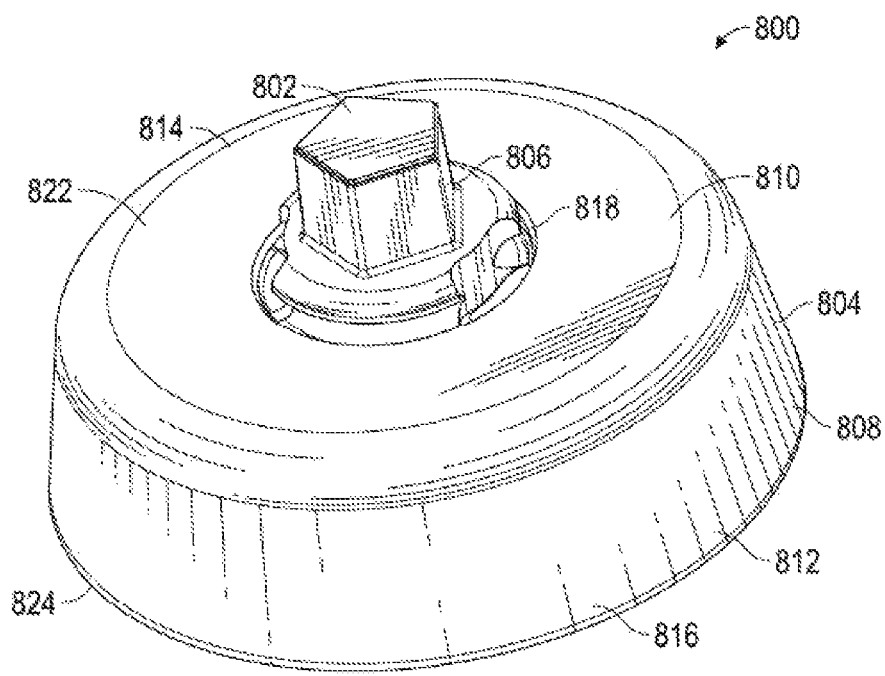
FIG. 8 is a perspective view of a nozzle cap assembly including the antenna assembly of FIG. 1 according to another aspect of the present disclosure.

Referring to FIG. 8, the antenna cover 804 can comprise a body 808 having a top end 822 and a bottom end 824. In various aspects, the antenna cover 804 can comprise a base 810 at the top end 822 and a curved side wall 812 extending from the base 810 to the bottom end 824. The base 810 can have an inner surface (not shown) and an outer surface 814. The curved side wall 812 can have an inner surface (not shown) and an outer surface 816. The inner surface of the base 810 and the inner surface of the curved side wall 812 together can define an antenna cover cavity (not shown), into which the nozzle cap 802, the spacer 1002, and antenna assembly 100 can optionally be positioned.

Optionally, as shown in FIG. 8, in various aspects, the base 810 can define a cover bore 818 at the top end 822 extending through the antenna cover 804 from the inner surface to the outer surface 814. Optionally, the nut base 806 can extend through the cover bore 818 such that the nut base 806 may be accessed by the operator when the antenna cover 804 is positioned on the nozzle cap 802.

Figure 10:
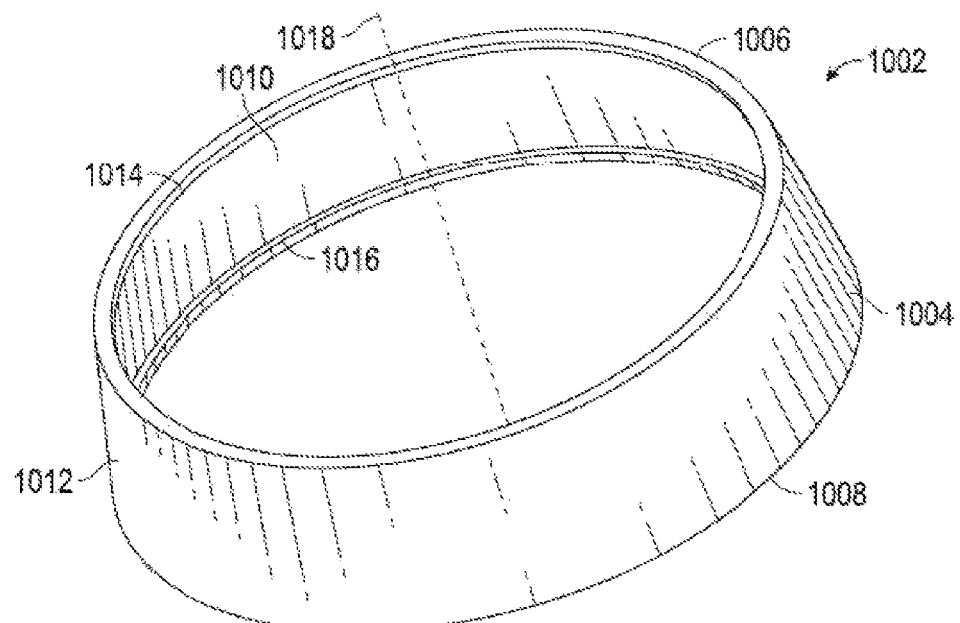
FIG. 10 is a perspective view of a spacer of the nozzle cap assembly of FIG. 8.

Referring to FIG. 10, the spacer 1002 can comprise a hollow body 1004 having a top end 1006, a bottom end 1008, a curved inner surface 1010, and a curved outer surface 1012. Optionally, the hollow body 1004 can be shaped like a truncated cone. One skilled in the art will appreciate that other geometric shapes, for example and without limitation a substantially cylindrical shape, can be present. In various aspects, the spacer 1002 can comprise a top lip 1014 at the top end 1006 and a bottom lip 1016 at the bottom end 1008. In this aspect, the top lip 1014 can extend radially inward from the top end 1006 towards a center axis 1018 of the spacer 1002. Similarly, the bottom lip 1016 can extend radially inward from the bottom end 1008 towards the center axis 1018 of the spacer 1002.

Figure 11:
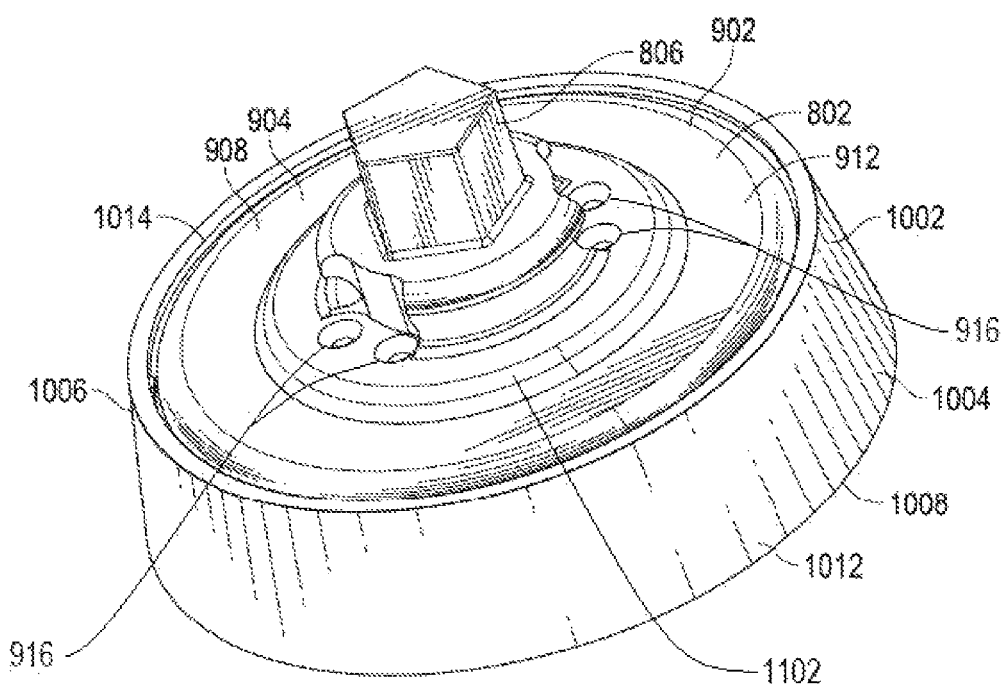
FIG. 11 is a perspective view of the spacer of FIG. 10 mounted on the nozzle cap of FIG. 9.

FIG. 11 shows the spacer 1002 mounted on the nozzle cap 802. In one aspect, the spacer 1002 can be sized to approximate a width or diameter of the nozzle cap 802. In another aspect, the spacer 1002 can be mounted on the nozzle cap 802 such that the curved inner surface 1010 of the body 1004 of the spacer 1002 faces the outer surface 910 of the curved side wall 906 of the nozzle cap 802. In another aspect, a distance from the top lip 1014 to the bottom lip 1016 of the spacer 1002 can be greater than a distance from the top end 912 to the bottom end 914 of the nozzle cap 802. In this aspect, the top lip 1014 and the bottom lip 1016 can be utilized to retain the spacer 1002 on the nozzle cap 802 via a snap-fit configuration by positioning the nozzle cap 802 between the top lip 1014 and the bottom lip 1016, with the top lip 1014 engaging the spacer tabs 918A,B and the bottom lip 1016 engaging the bottom end 824 of the nozzle cap 802. The antenna cover 804 can be placed over the spacer 1002 mounted on the nozzle cap 802. In various aspects, the base 904 can define a raised portion 1102.

FIG. 12 shows another view of the spacer 1002 mounted on the nozzle cap 802. FIG. 12 also shows the threading 1208 and the nozzle cap cavity 1206 of the nozzle cap 802.

Referring to FIG. 13, it is contemplated that the PCB 102 can be bent or formed into an annular shape to form a curved PCB. Optionally, the PCB 102 can be bent to form a hollow cylindrical shape, as shown for example and without limitation in FIG. 13. One skilled in the art will appreciated that the PCB 102 can be bent to form other geometric shapes, such as, for example and without limitation, a truncated cone shape as shown in FIG. 13.

In one aspect, the PCB 102 of the antenna assembly 100 can be formed into a curved shape and mounted around the curved side wall 906 of the nozzle cap 802 of the fire hydrant. As previously described, it is contemplated that the PCB 102 can be configured to be mounted around various other curved surfaces such as around light poles, various utility structures having curved surfaces, decorative columns, curved structural supports, and various other types of structures. In the aspect where the antenna assembly 100 is mounted on the nozzle cap 802, the antenna assembly 100 can maintain at least one section of the antenna assembly 100 facing upwards, regardless of the rotation end stop of the nozzle cap 802 when mounted on the hydrant. In one aspect, it is contemplated that fasteners (not shown) can be utilized with the through holes 118 to secure the PCB 102 to the antenna assembly 100. However, it is also contemplated that the PCB 102 can be secured to the antenna assembly 100 through various other fastening mechanisms that may or may not utilize the through holes 118.

In one aspect, the antenna assembly 100 can be mounted such that the spacer 1002 can be between the nozzle cap 802 and the antenna assembly 100. In this aspect, the inward-facing side 502 of the antenna assembly 100 can face the curved outer surface 1012 of the spacer 1002. In another aspect with the antenna cover 804, the outward-facing side 114 can face the inner surface of the curved side wall 812 of the antenna cover 804.

Referring to FIGS. 14-20, an example of a nozzle cap assembly 1400 utilizing the antenna assembly 100 of FIG. 6 is illustrated. The nozzle cap assembly 1400 can comprise a nozzle cap 1402, a mounting plate 1404, an antenna cover 1406, and the antenna assembly 100.

In one aspect, the nozzle cap 1402 can comprise a body 1408 having a top end 1410 and a bottom end 1412. The nozzle cap 1402 can comprise a base 1422 at the top end 1410 and a curved side wall 1414 extending from the base 1422 to the bottom end 1412. The base 1422 can comprise an inner surface (not shown) and an outer surface 1424 and the curved side wall 1414 can comprise an inner surface (not shown) and an outer surface 1416. The inner surfaces of the base 1422 and curved side wall 1414, respectively, can together define a nozzle cap cavity, which can be similar to the nozzle cap cavity 1206.

Optionally, the nozzle cap 1402 can define an alignment groove 1418 in the body 1408 at the top end 1410. In one aspect, the alignment groove 1418 can extend around a perimeter of the base 1422. As described in greater detail below, in one aspect, the alignment groove 1418 can be utilized by the operator to position and lock the antenna cover 1406 on the nozzle cap 1402.

In another aspect, the nozzle cap 1402 can comprise a nut base 1420 extending axially upwards from the base 1422. Compared to the nut base 806, the nut base 1420 can be elongated to accommodate the antenna cover 1406, mounting plate 1404, and antenna assembly 100 at a position axially above the base 1422. However, it is contemplated that the nut base 1420 can also be a conventionally-sized nut base that may not be elongated.

Optionally, the nozzle cap 1402 can comprise various devices or structures mounted at various locations on the body 1408. For example and without limitation, in one aspect, the nozzle cap 1402 can comprise a sensor 1426, such as a leak sensor, vibration sensor, tamper sensor, or various other types of sensors, secured on the base 1422.

Figure 14:
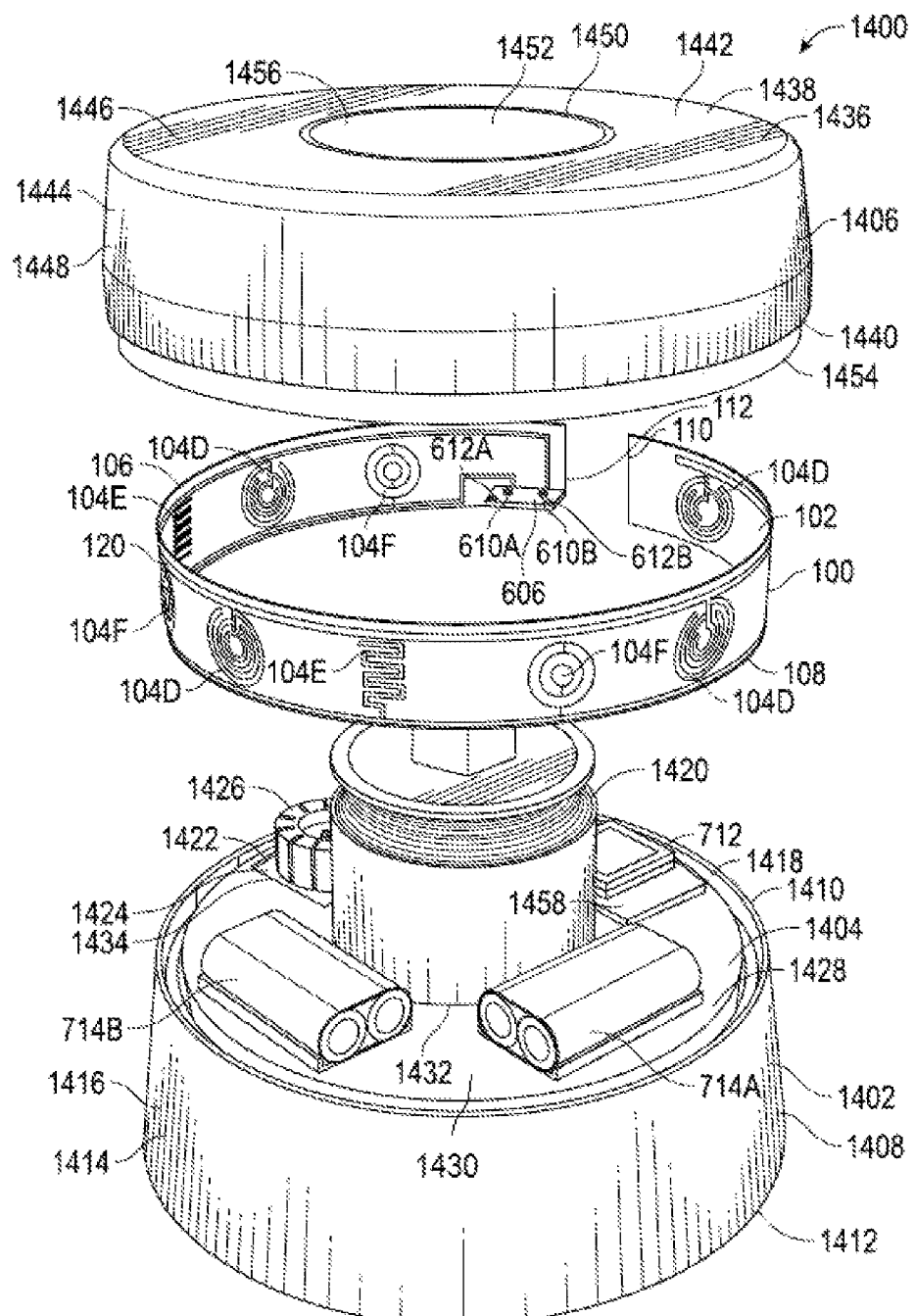
FIG. 14 is an exploded view of a nozzle cap assembly including the antenna assembly of FIG. 6 according to another aspect of the present disclosure.
Figure 15:
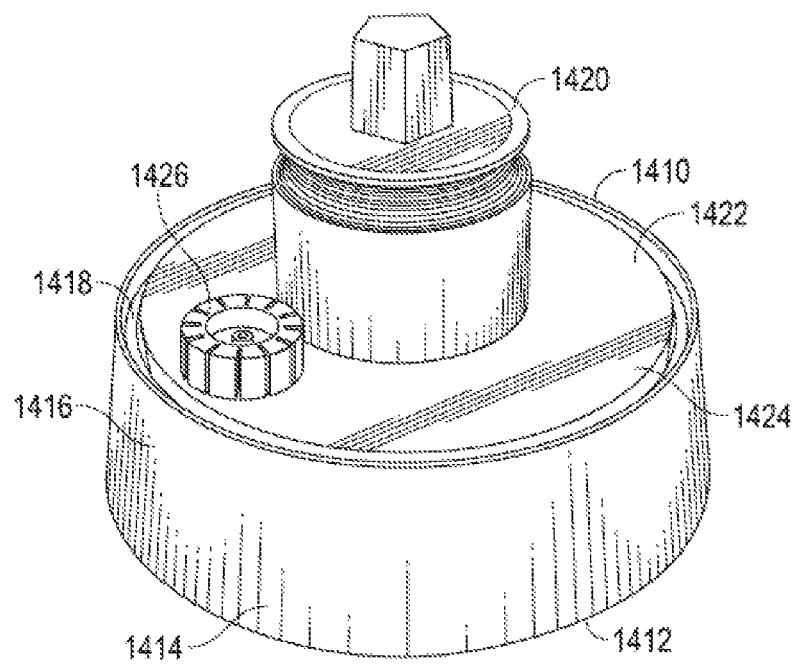
FIG. 15 is a perspective view of a nozzle cap of the nozzle cap assembly of FIG. 14.
Figure 16:
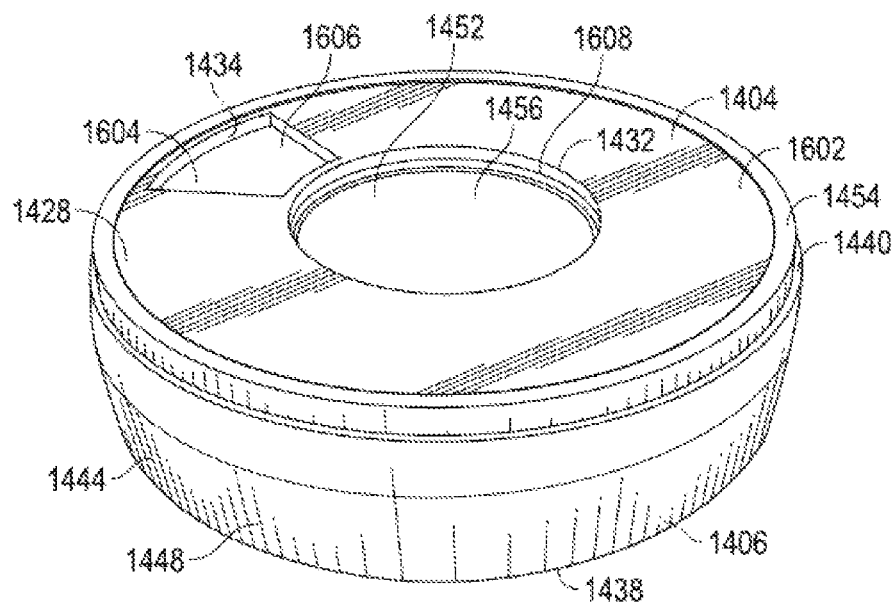
FIG. 16 is a perspective view of an antenna cover and a mounting plate of the nozzle cap assembly of FIG. 14.

In one aspect, as shown in FIGS. 14 and 16, the mounting plate 1404 can comprise a body 1428 with a top surface 1430 and a bottom surface 1602. Optionally, the body 1428 can be an annular shape defining a substantially circular shaped bore 1432. One having skill in the art will appreciate that other geometric shapes of the body 1428 and the bore 1432 can be present. In one aspect, the bore 1432 can be dimensioned such that the mounting plate 1404 can be positioned on the nozzle cap 1402 with the nut base 1420 extending through the bore 1432.

Optionally, the mounting plate 1404 can define various other bores to accommodate any devices or structures mounted on the base 1422 of the nozzle cap 1402. For example and without limitation, in the aspect where the nozzle cap 1402 can comprise the sensor 1426, the mounting plate 1404 can define a sensor bore 1434 through which the sensor 1426 can extend.

Optionally, in a further aspect, the mounting plate 1404 can comprise various additional structures or components positioned or secured to the mounting plate 1404. For example and without limitation, the additional structures or components positioned or secured to the mounting plate 1404 can be the modem 712, the power supplies 714A,B, an additional PCB 1458, or various other structures or components as desired.

Figure 17:
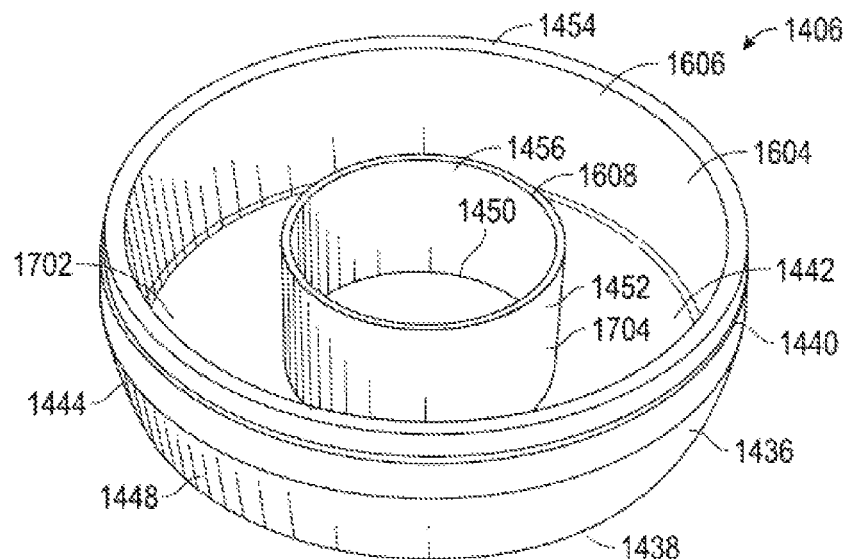
FIG. 17 is a perspective view of the antenna cover of FIG. 16.

In one aspect, the antenna cover 1406 can be similar to the antenna cover 804 and can comprise a body 1436 having a top end 1438 and a bottom end 1440. In one aspect, the antenna cover 1406 can comprise a base 1442 at the top end 1438 and an outer wall 1444 extending from the base 1442 to the bottom end 1440. Referring to FIGS. 14, 16, and 17, the base 1442 can have an outer surface 1446 and an inner surface 1702 and the outer curved wall 1444 can have an outer surface 1448 and an inner surface 1604. The inner surface 1702 and the inner surface 1604 together can define an antenna cover cavity 1606. Optionally, the outer wall 1444 can be a cylindrical shape; however, it will be appreciated that other geometric shapes of the outer wall 1444 can be present.

In another aspect, an alignment lip 1454 can extend axially downwards from the outer wall 1444 at the bottom end 1440. In this aspect, the alignment lip 1454 can be dimensioned and shaped such that the alignment lip 1454 can be positioned within the alignment groove 1418. In a further aspect, the alignment lip 1454 within the alignment groove 1418 can position and secure the antenna cover 804 on the nozzle cap 1402.

Optionally, as shown in FIG. 14, the base 1442 can define a cover bore 1450 in one aspect. In another aspect, the antenna cover 1406 can comprise an inner wall 1452 surrounding the cover bore 1450 and extending axially downwards from the inner surface 1702 of the base 1442 into the antenna cover cavity 1606 to a bottom end 1608, as shown in FIG. 16. The inner wall 1452 can comprise an inner surface 1456 and an outer surface 1704, as shown in FIG. 17. Optionally, the cover bore 1450 can be a substantially circular-shaped bore and the inner wall 1452 can be a cylindrical shape; however, one skilled in the art will appreciate that other geometric shapes of the cover bore 1450 and inner wall 1452 can be present.

Figure 18:
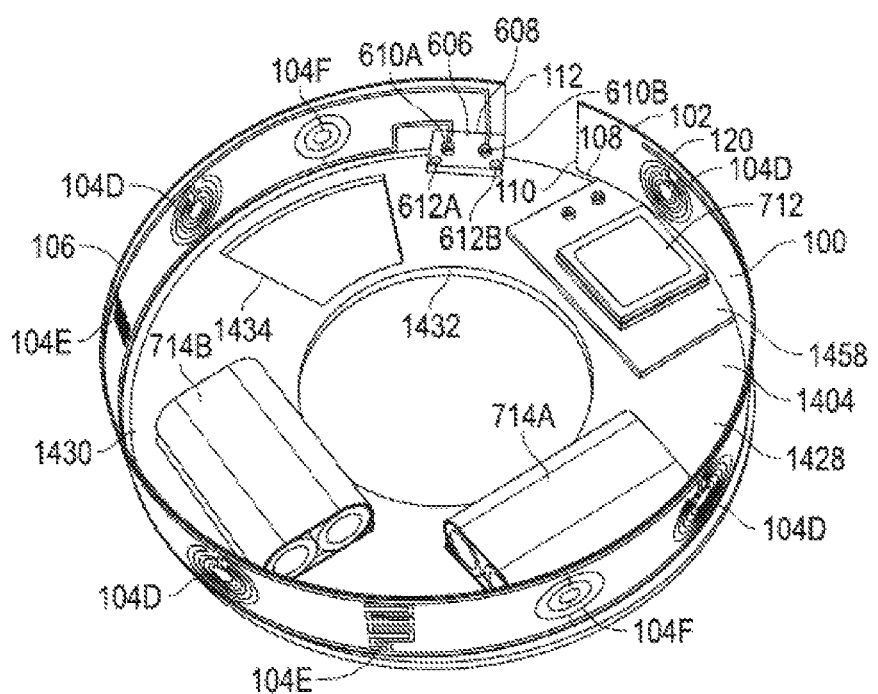
FIG. 18 is a perspective view of the antenna assembly of FIG. 6 secured to the mounting plate of FIG. 16.

Referring to FIG. 18, in one aspect, the securing tab 606 of the antenna assembly 100 can be bent along the bend line 608 and the mechanical connectors or fasteners 612A,B can be utilized to secure the antenna assembly 100 to the mounting plate 1404. Optionally, the antenna assembly 100 can be secured to the mounting plate 1404 such that the antenna assembly 100, other than the securing tab 606, can be substantially perpendicular to the mounting plate 1404.

Figure 19:
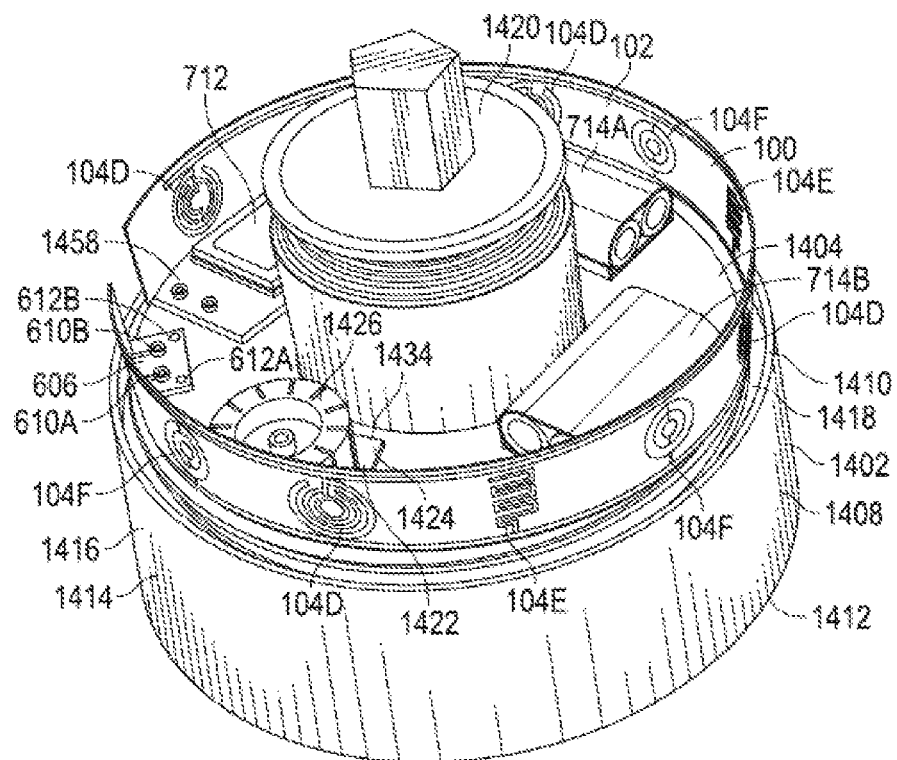
FIG. 19 is a perspective view of the antenna assembly of FIG. 6 secured to the mounting plate of FIG. 16 and positioned on the nozzle cap of FIG. 15.

Referring to FIG. 19, the mounting plate 1404 can be positioned on the nozzle cap 1402 such that the nut base 1420 extends through the bore 1432. In one aspect, the bottom surface 1602 can face and can be in contact with the outer surface 1424 of the base 1422 of the nozzle cap 1402.

Figure 20:
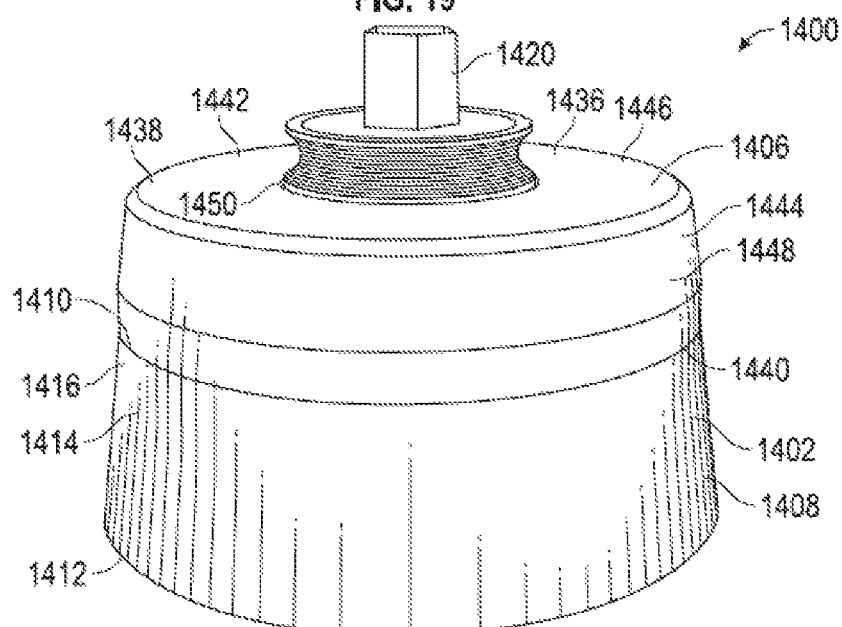
FIG. 20 is a perspective view of the assembled nozzle cap assembly of FIG. 14.

Referring to FIG. 20, the antenna cover 1406 can be positioned on the nozzle cap 1402 such that the nut base 1420 extends through the cover bore 1450. Optionally, as described previously, the alignment lip 1454 can be positioned in the alignment groove 1418. In one aspect, the antenna assembly 100 and mounting plate 1404 can be housing within the antenna cover cavity 1606 when the antenna cover 1406 is positioned on the nozzle cap 1402.

Figure 21:
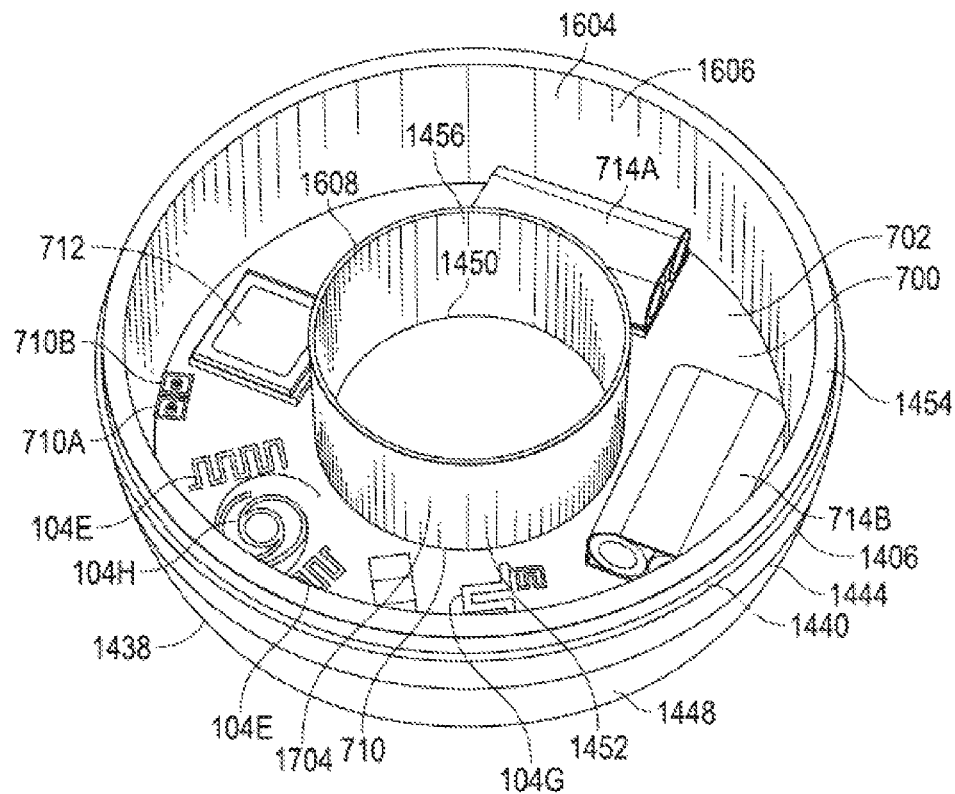
FIG. 21 is a perspective view of the antenna of FIG. 7 positioned in the antenna cover of FIG. 14.

Referring to FIG. 21, in another aspect, the antenna assembly 700 can be used with the antenna cover 1406. In this aspect, the antenna assembly 700 can be positioned in the antenna cover cavity 1606. In a further aspect, the bottom side 708 of the PCB 702 can be facing and can be in contact with the inner surface 1702 of the base 1442 of the antenna cover 1406, and can be attached to the inner surface 1702 by screws, pressure-fitted tabs, melted tabs or stubs, adhesives, or any similar fastening devices. In another aspect, the inner wall 1452 of the antenna cover 1406 can extend through the bore 710 of the antenna assembly 700. In one aspect, the antenna assembly 700 and antenna cover 1406 can be mounted on the nozzle cap 1402 in a similar manner as described above to form a nozzle cap assembly that looks like the nozzle cap assembly 1400 shown in FIG. 20.

Referring to FIGS. 22-25, an example of a nozzle cap assembly 2200 utilizing the antenna assembly 100 of FIG. 6 is illustrated. In one aspect, the nozzle cap assembly 2200 can comprise a nozzle cap 2202, an antenna cover 2204, and a spacer 2502.

Figure 22:
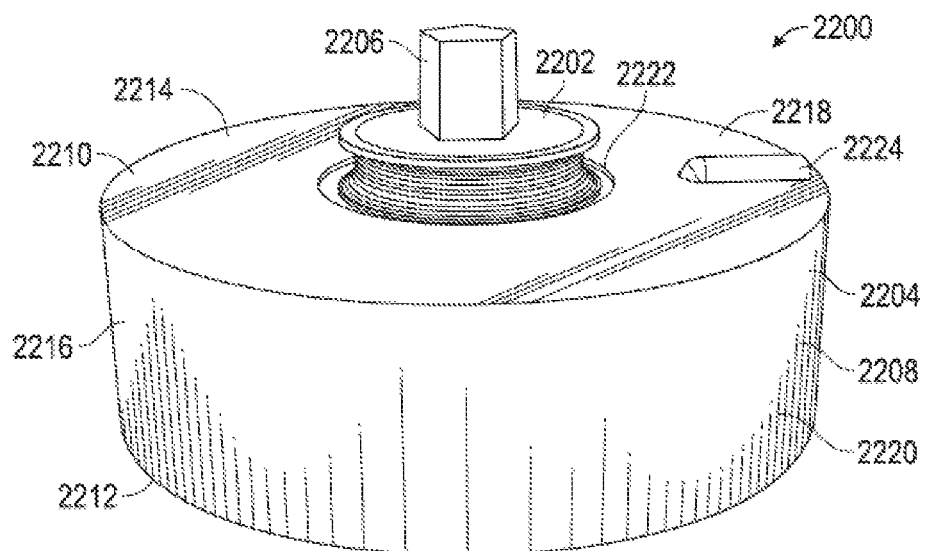
FIG. 22 is a perspective view of a nozzle cap assembly including the antenna assembly of FIG. 1 according to another aspect of the present disclosure.
Figure 23:
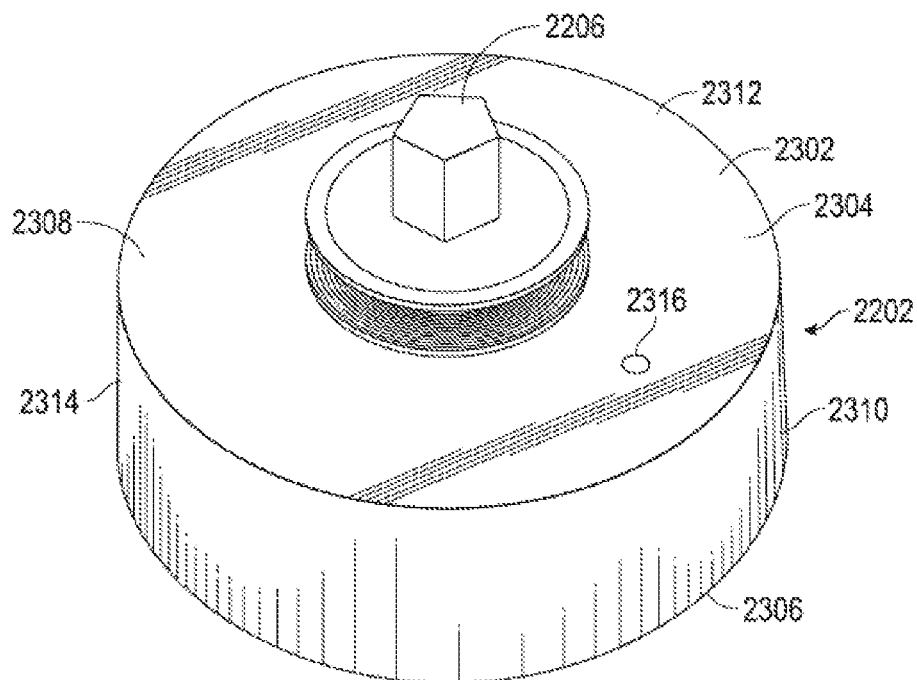
FIG. 23 is a perspective view of a nozzle cap of the nozzle cap assembly of FIG. 22.
Figure 26:
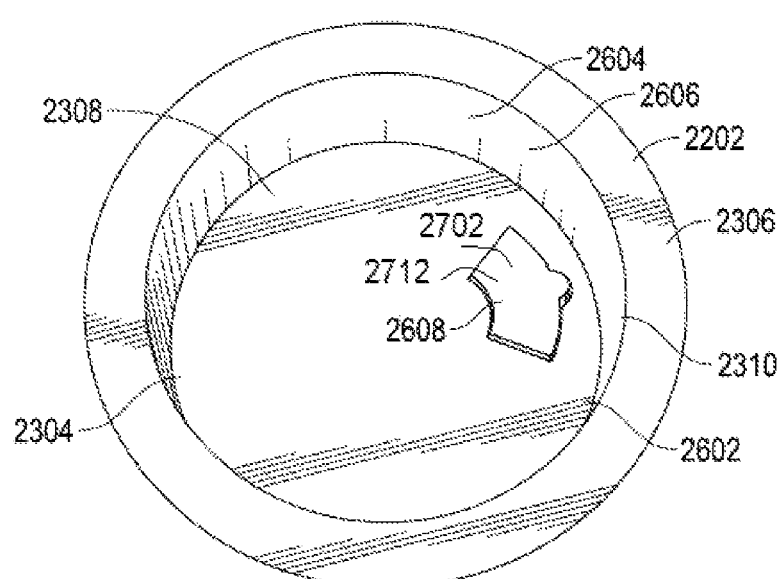
FIG. 26 is a perspective view of another aspect of the nozzle cap assembly of FIG. 22 with a coupling.

Referring to FIGS. 22,23, and 26 in one aspect, the nozzle cap 2202 can comprise a body 2302 having a top end 2304 and a bottom end 2306. The nozzle cap 2202 can comprise a base 2308 at the top end 2304 and a curved side wall 2310 extending from the base 2308 to the bottom end 2306. The base 2308 can comprise an inner surface 2602 and an outer surface 2312 and the curved side wall 2310 can comprise an inner surface 2604 and an outer surface 2314. The inner surfaces of the base 2308 and curved side wall 2310, respectively, can together define a nozzle cap cavity 2606.

In another aspect, the nozzle cap 2202 can comprise a nut base 2206 extending axially upwards from the base 2308. In yet another aspect, the nozzle cap 2202 optionally can define a through hole 2316 in the base 2308. In one aspect, the through hole 2316 can be utilized to guide a cable through the nozzle cap 2202.

Figure 24:
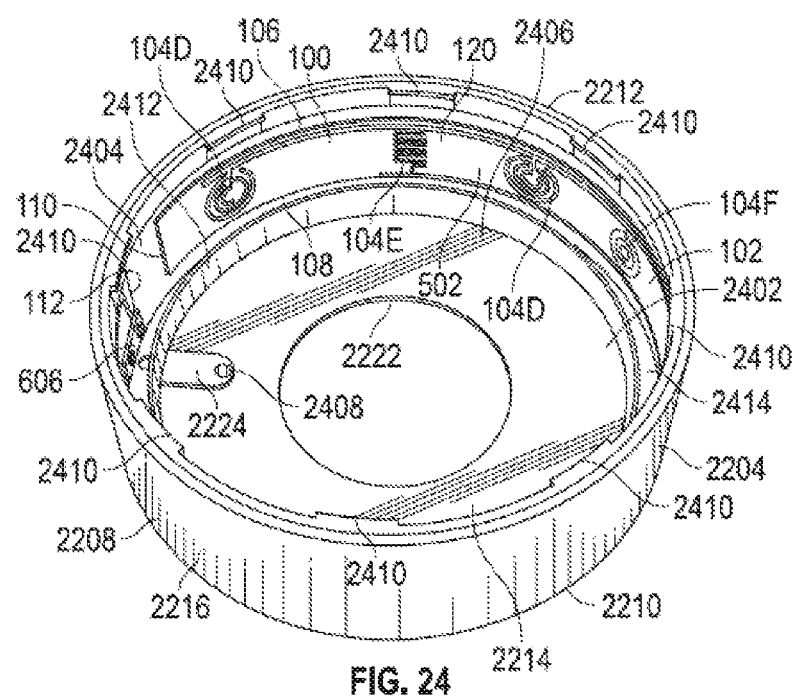
FIG. 24 is a perspective view of the antenna assembly of FIG. 1 positioned in an antenna cover of the nozzle cap assembly of FIG. 22.

Referring to FIGS. 22 and 24, the antenna cover 2204 can comprise a body 2208 having a top end 2210 and a bottom end 2212. In various aspects, the antenna cover 2204 can comprise a base 2214 at the top end 2210 and a curved side wall 2216 extending from the base 2214 to the bottom end 2212. The base 2214 can have an inner surface 2402 and an outer surface 2218. The curved side wall 2216 can have an inner surface 2404 and an outer surface 2220. The inner surface of the base 2214 and the inner surface of the curved side wall 2216 together can define an antenna cover cavity 2406, into which the nozzle cap 2202, the spacer 2502, and the antenna assembly 100 can optionally be positioned.

Optionally, as shown in FIG. 22, in various aspects, the base 2214 can define a cover bore 2222 at the top end 2210 extending from the inner surface 2404 to the outer surface 2218. Optionally, the nut base 2206 can extend through the cover bore 2222 such that the nut base 2206 may be accessed by the operator when the antenna cover 2204 is positioned on the nozzle cap 2202.

In yet another aspect, the antenna cover 2204 can optionally define a cable guide 2224. In one aspect, a portion of the cable guide 2224 can extend upwards from the base 2214 as shown in FIG. 22. In another feature, the cable guide 2224 can define a guide opening 2408 that can be matched and aligned with the through hole 2316 to guide the cable through the antenna cover 2204. The cable guide 2224 allows the nozzle cap 2202 to be positioned closer to the antenna cover 2204 and protects the cable from damage or pinching between the nozzle cap 2202 and the antenna cover 2204. It is contemplated that the cable can connect to an external antenna (not shown) or various other structures or devices external to the nozzle cap assembly 2200 at one end and to a radio canister (not shown) or other structures at another end.

Referring to FIG. 24, the antenna assembly 100 can be positioned and secured within the antenna cover 2204 such that the outward-facing side 114 faces the inner surface 2404 of the curved side wall 2216. In one aspect, the antenna cover 2204 can optionally define a plurality of locking tabs 2410 extending inwards from the bottom end 2212. Optionally, the locking tabs 2410 can be substantially perpendicular to the curved side wall 2216; however, it is also contemplated that the locking tabs 2410 can have various other configurations relative to the curved side wall 2216. It will be appreciated the number or the shape of the locking tabs 2410 should not be considered limiting on the current disclosure as it is contemplated that any number of locking tabs 2410 having any desired shape may be utilized. For example and without limitation, in another aspect, the antenna cover 2204 can define a single, continuous locking tab 2410 extending inward from the bottom end 2212.

In a further aspect, the antenna cover 2204 can optionally define an inner wall 2412 extending downwards from the base 2214 into the antenna cover cavity 2406. In one aspect, a spacer alignment groove 2414 can be defined between the inner wall 2412 and the inner surface 2404 of the curved side wall 2216.

Figure 25:
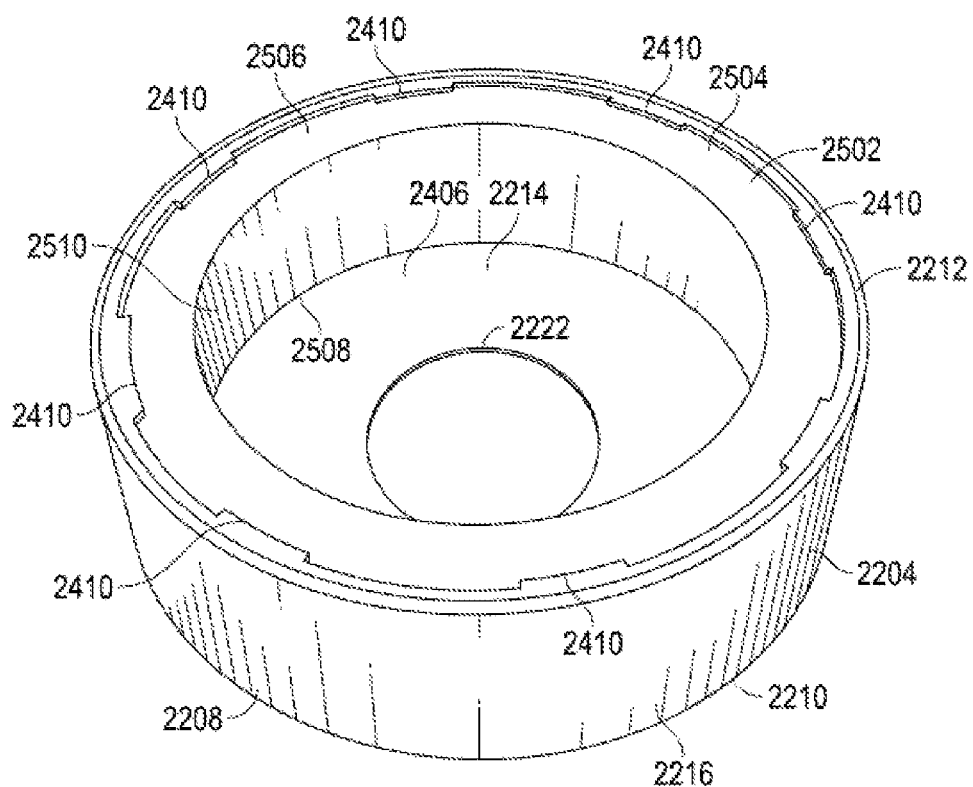
FIG. 25 is a perspective view of a spacer of the nozzle cap assembly of FIG. 22 positioned within the antenna cover of FIG. 24.

Referring to FIG. 25, the spacer 2502 can comprise a hollow body 2504 having a top end 2506, a bottom end 2508, a curved inner surface 2510, and a curved outer surface (not shown). Optionally, the hollow body 2504 can be a substantially cylindrical shape; however, one skilled in the art will appreciate that other geometric shapes can be present. In one aspect, the locking tabs 2410 and the spacer alignment groove 2414 can be utilized by the operator to position and secure the spacer 2502 within the antenna cover 2204, as shown in FIG. 25.

Figure 29:
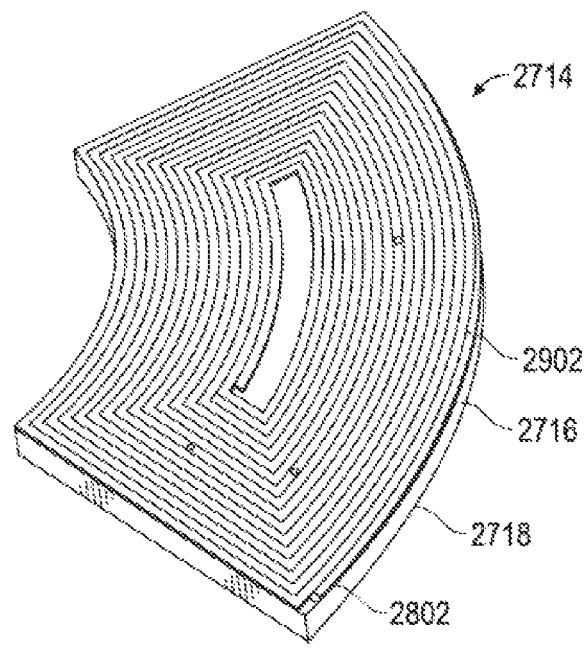
FIG. 29 is another perspective view of the antenna structure of the coupling of FIG. 26.
Figure 30:
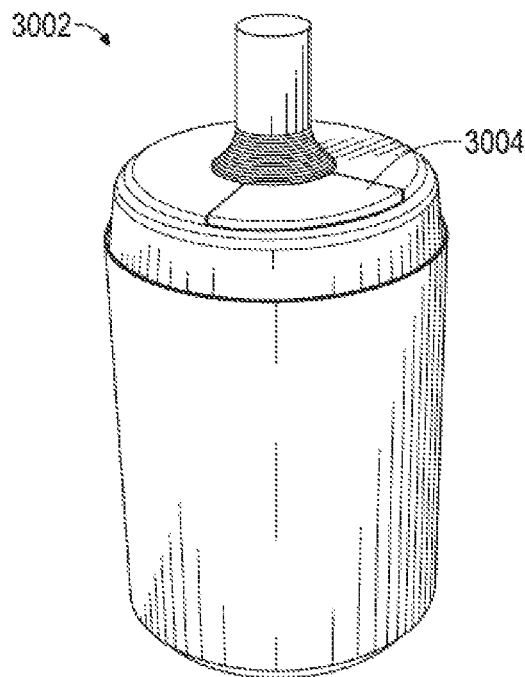
FIG. 30 is a perspective view of a radio canister with a coupling configured to communicate with the coupling of FIG. 26.
Figure 31:
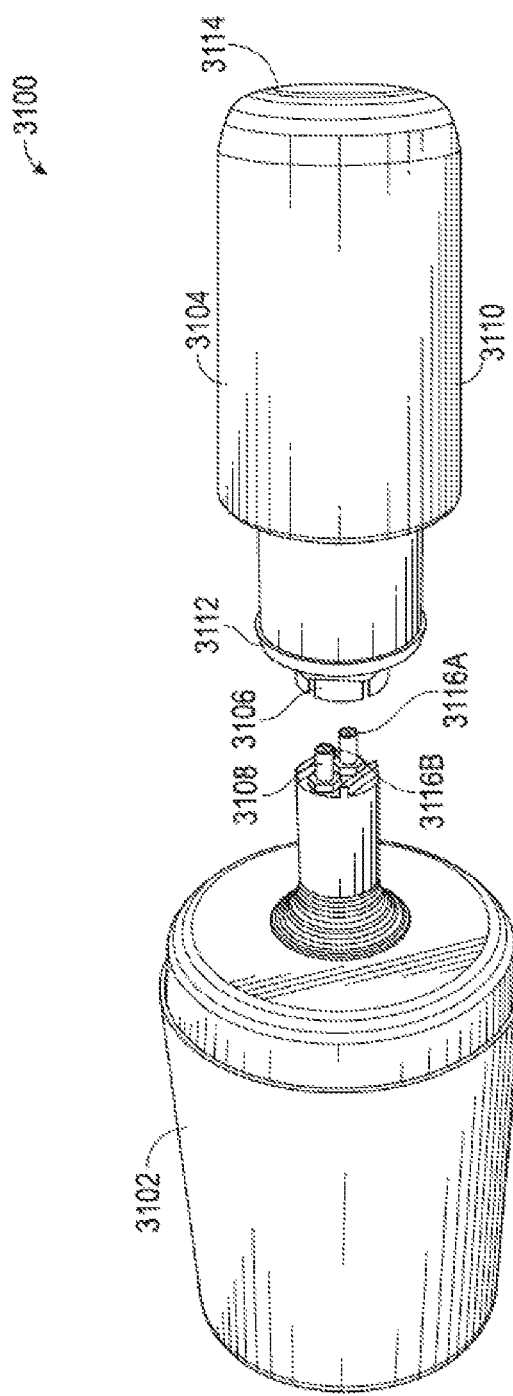
FIG. 31 is an exploded view of an antenna assembly according to another aspect of the present disclosure.
Figure 32:
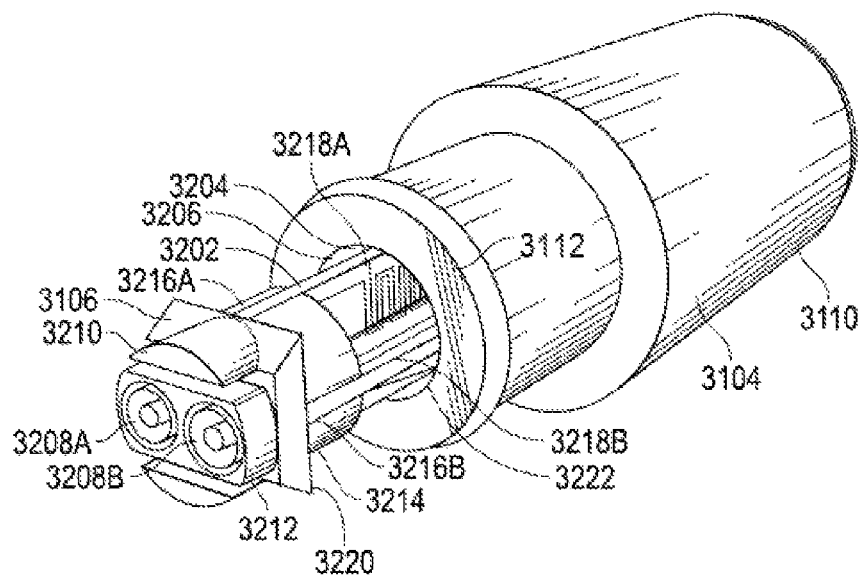
FIG. 32 is a partially-exploded view of a printed circuit board (PCB) assembly and an antenna cover having a cover radio frequency (RF) connector of the antenna assembly of FIG. 31.
Figure 33:
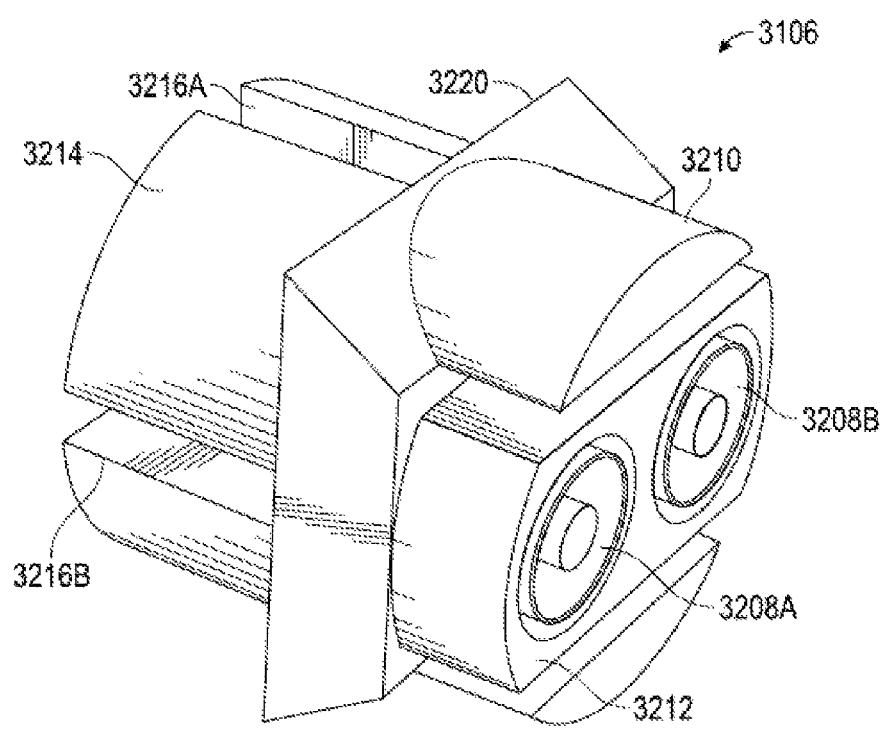
FIG. 33 is a perspective view of the cover RF connector of FIG. 32.

Referring to FIGS. 26-30, in another aspect, in place of the cable that can be guided through the through hole 2316 and cable guide 2224, the nozzle cap assembly 2200 can comprise a coupling 2608 mounted on the nozzle cap 2202. In one aspect, a portion of the coupling 2608 can be positioned within the through hole 2316. The coupling 2608 can be connected to the external antenna and can be wirelessly coupled to a radio canister 3002, which is shown in FIG. 30.

Figure 27:
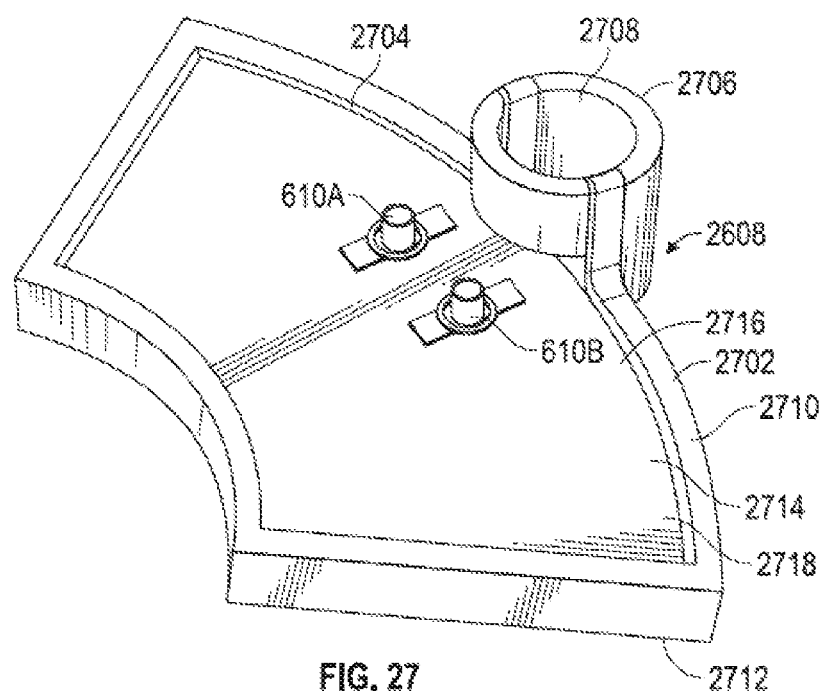
FIG. 27 is a perspective view of the coupling of FIG. 26.
Figure 28:
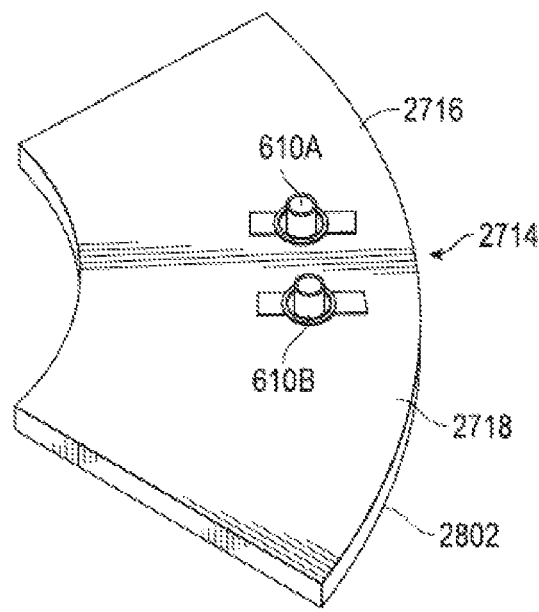
FIG. 28 is a perspective view of an antenna structure of the coupling of FIG. 26.

Referring to FIGS. 26 and 27, the coupling 2608 can comprise a body 2702 having a top side 2710 and a bottom side 2712. The body 2702 can define an antenna assembly indentation 2704 into which an antenna assembly 2714 can be positioned. The body 2702 can also comprise a securing stem 2706. Optionally, the stem 2706 can be a substantially cylindrical shape defining a circular bore 2708; however, the shape of the stem 2706 or the bore 2708 should not be considered limiting on the current disclosure as it is contemplated that other geometric shapes of the stem 2706 and the bore 2708 can be present. In another aspect, the stem 2706 does not define the bore 2708. The stem 2706 can extend upwards from the top side 2710. In one aspect, the stem 2706 can be configured to be positioned within the through hole 2316. The shape of the body 2702 should not be considered limiting on the current disclosure as it is contemplated that various geometric shapes of the body 2702 can be present.

The antenna assembly 2714 can comprise a PCB 2716 and an antenna structure 2902 (shown in FIG. 29). The PCB 2716 can comprise a top side 2718 and a bottom side 2802 (shown in FIG. 28). In one aspect, the PCB 2716 can comprise the electrical connectors 610A,B. One skilled in the art will appreciate that the electrical connectors 610A,B can be disposed on at least one of the top side 2718 and the bottom side 2802 of the PCB 2716. The shape of the PCB 2716 should not be considered limiting on the current disclosure as it is contemplated that various other geometric shapes of the PCB 2716 can be present. In one aspect, it is contemplated that the PCB 2716 can be shaped such that the PCB 2716 can be positioned within the antenna assembly indentation 2704. In one aspect, the antenna assembly 2714 can be a multi-frequency PCB trace coil pad. Optionally, as shown in FIG. 29, the antenna structure 2902 can be disposed on the bottom side 2802 of the PCB 2716. One skilled in the art will appreciate that the antenna structure 2902 can be disposed on at least one of the top side 2718 and the bottom side 2802 of the PCB 2716. In one aspect, the PCB 2716 can be configured for wireless communication with the radio canister 3002, such as through the use of inductive coupling, to eliminate the use of cables and allow for easier service and maintenance on the nozzle cap assembly 2200. Referring to FIG. 30, the radio canister 2002 can comprise an antenna assembly 3004 that can be communicatively coupled to the antenna assembly 2714. In one aspect, the antenna assembly 2714 can be a multi-frequency PCB trace coil pad. In another aspect, it is contemplated that the antenna structures of the antenna assemblies 2714,3004 can be similar to the antenna structures 104 or different from the antenna structures 104, depending on application.

Referring to FIGS. 31-35, an example of an antenna assembly 3100 is illustrated. The antenna assembly 3100 can comprise a radio canister 3102 having a canister radio frequency (RF) connector 3108, a PCB assembly 3202 (shown in FIG. 32), and an antenna cover 3104 having a cover RF connector 3106. The antenna cover 3104 can comprise a first end 3112, a second end 3114, an outer surface 3110, and an inner surface 3204. The inner surface 3204 can define an antenna cover cavity 3206. In one aspect, the antenna cover 3104 can comprise an antenna cover opening 3222 providing access to the cover cavity 3206 at the first end 3112. In one aspect, the antenna cover 3104 can be configured to receive the PCB assembly 3202 within the antenna cover cavity 3206.

In one aspect, the cover RF connector 3106 can define a body 3210. The body can comprise a canister-connecting portion 3212 and a PCB-connecting portion 3214. In one aspect, the canister-connecting portion 3212 can comprise connectors 3208A,B configured to engage with connectors 3116A,B of the canister RF connector 3108. The number of connectors 3208 or connectors 3116 should not be considered limiting on the current disclosure as it is contemplated that any number of connectors 3208 or connectors 3116 can be present. In another aspect, the PCB-connecting portion 3214 can define slots 3216A,B configured to engage and receive the PCB assembly 3202. In one aspect, the PCB assembly 3202 can comprise two PCBs 3218A,B coupled together, as described in greater detail below. It is contemplated that the number of slots 3216 can correspond with the number of PCBs 3218 in various aspects. In another aspect, the cover RF connector 3106 can be positioned such that the PCB-connecting portion 3214 can be within the antenna cover cavity 3206 and an engagement edge 3220 of the canister-connecting portion 3212 engages the first end 3112 of the antenna cover 3104.

Figure 34:
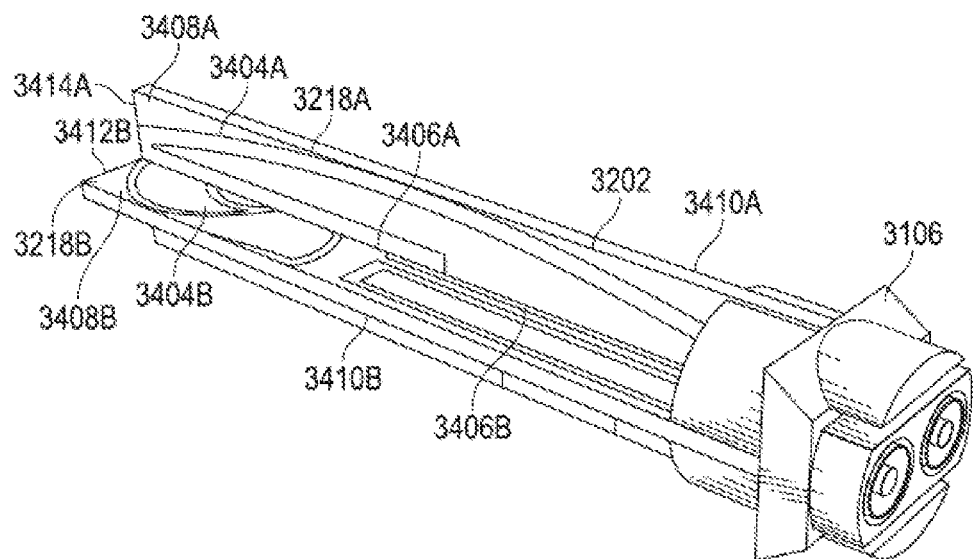
FIG. 34 is a perspective view of the cover RF connector and PCB assembly of FIG. 32.
Figure 35:
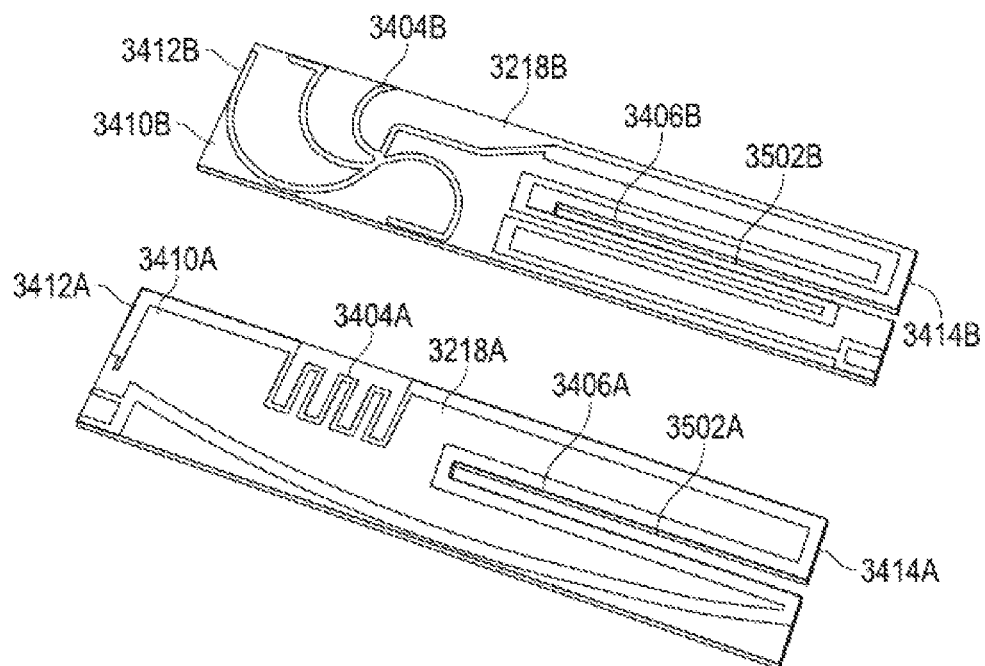
FIG. 35 is a perspective view of the PCB assembly of FIG. 32 disassembled.

Referring to FIGS. 34 and 35, each PCB 3218A,B, respectively, can comprise at least one antenna structure 3404A,B, respectively. It is contemplated that in one aspect, that the antenna assembly 3100 can be configured for cellular quad-band and GPS coverage. In another aspect, it is contemplated that the antenna structures 3404 can be similar to the antenna structures 104 or different from the antenna structures 104, depending on application. The number or type of antenna structure 3404 on the PCBs 3218 should not be considered limiting as it is contemplated that various numbers, types, or combinations thereof of antenna structures 3404 can be present on each PCB 3218A,B, respectively. Additionally, the number of PCBs 3218 should not be considered limiting.

As shown in FIGS. 34 and 35, each PCB 3218A,B can define a first side end 3412A,B and a second side end 3414A,B distal from the first side end 3412A,B, respectively. In another aspect, each PCB 3218A,B can define a top side 3408A,B and a bottom side 3410A,B, respectively. In one aspect, each PCB 3218A,B defines an engagement slot 3406A,B, respectively, that can be utilized to couple the PCBs 3218A,B together. In another aspect, the engagement slots 3406A,B can extend from the second side ends 3414A,B partially through the PCBs 3218A,B towards the first side ends 3412A,B, respectively. In this aspect, each engagement slot 3406A,B can define a slot surface 3502A,B, respectively. The shape of the engagement slots 3406 should not be considered limiting on the current disclosure as it is contemplated that various shaped slots can be defined. In one aspect, the slots 3406A,B can be dimensioned to accept the PCBs 3218A,B within the slots 3406A,B, respectively. In this aspect, when the PCBs 3218A,B are assembled to form the PCB assembly 3202, the slot surface 3502A can cover a portion of the top side 3408B and a portion of the bottom side 3410B of the PCB 3218B. Similarly, the slot surface 3502B can cover a portion of the top side 3408A and a portion of the bottom side 3410A of the PCB 3218A.

In one aspect, the PCBs 3218A,B can be combined such that the PCB assembly 3202 can have a general "x" shape. The PCB assembly 3202 can be positioned within the slots 3216A,B of the PCB-connecting portion 3214 of the cover RF connector 3106. In one aspect, the cover RF connector 3106 can be positioned such that the PCB-connecting portion 3214 and the PCB assembly 3202 is within the antenna cover cavity 3206. In one aspect, the shape of the PCBs 3218A,B can allow the PCB assembly 3202 to fit in the antenna cover opening 3222 and into the antenna cover cavity 3206. In another aspect, the PCBs 3218A,B combined via positioning in the slots 3405A,B can allow the antenna structures 3404 to face multiple directions without being bent or wrapped.

It should be emphasized that the above-described aspects are merely possible examples of implementations, merely set forth for a clear understanding of the principles of the present disclosure. Many variations and modifications can be made to the above-described aspect(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

That which is claimed is:

1. A nozzle cap assembly comprising:
    a nozzle cap body defining a top end and a bottom end, the nozzle cap body defining a base positioned at the top end and a curved side wall extend from the base down to the bottom end;
    an enclosure coupled to the top end, the enclosure rotationally fixed relative to the nozzle cap body, the enclosure at least partially defining an enclosure cavity; and
    a nut base positioned opposite from the nozzle cap body, the enclosure positioned between the nut base and the base.

2. The nozzle cap assembly of claim 1, further comprising a modem positioned inside the enclosure cavity.

3. The nozzle cap assembly of claim 2, further comprising an antenna assembly coupled in electrical communication with the modem, the antenna assembly comprising at least one antenna structure.

4. The nozzle cap assembly of claim 3, wherein the antenna assembly comprises a printed circuit board.

5. The nozzle cap assembly of claim 1, further comprising an antenna structure positioned inside the enclosure cavity, the antenna structure configured to communicate over a GPS frequency band.

6. The nozzle cap assembly of claim 1, wherein an antenna assembly is coupled to the enclosure.

7. The nozzle cap assembly of claim 6, wherein the antenna assembly is coupled to a curved wall of the enclosure.

8. The nozzle cap assembly of claim 6, wherein:
    the antenna assembly comprises a first printed circuit board; and
    the antenna assembly is coupled in electrical communication with a second printed circuit board positioned within the enclosure cavity.

9. The nozzle cap assembly of claim 1, further comprising a vibration sensor configured to detect vibrations passing through a fire hydrant when the nozzle cap body is coupled to the fire hydrant.

10. The nozzle cap assembly of claim 9, wherein the vibration sensor is coupled to the nozzle cap body.

11. A method for detecting a leak in a pipeline connected to a fire hydrant, the method comprising:
   securing a nozzle cap assembly to a nozzle of the fire hydrant, the nozzle cap assembly comprising:
      a nozzle cap body defining a top end and a bottom end, the nozzle cap body defining a base positioned at the top end and a curved side wall extend from the base down to the bottom end, a nozzle cavity extending into the nozzle cap body from the bottom end towards the base, the nozzle cap body defining internal threading within the nozzle cavity, the nozzle cavity receiving the nozzle;
      an enclosure coupled to the top end, the enclosure rotationally fixed relative to the nozzle cap body, the enclosure at least partially defining an enclosure cavity;
      a modem, at least one power source, a printed circuit board, and a first antenna structure positioned within the enclosure cavity, the first antenna structure configured to communicate over a GPS frequency band;
      a vibration sensor connected in electrical communication to the printed circuit board; and
      a nut base positioned opposite from the nozzle cap body, the enclosure positioned between the nut base and the base; and
   detecting a vibration travelling through the fire hydrant with the vibration sensor.

12. The method of claim 11, further comprising transmitting a signal with an antenna assembly of the nozzle cap assembly.

13. The method of claim 11, wherein the nozzle cap assembly further comprises an antenna assembly comprising at least one antenna structure and a cover layer, the antenna assembly coupled in electrical communication with the modem.

14. The method of claim 13, wherein the antenna assembly is coupled to a curved side wall of the enclosure.

15. The method of claim 14, wherein an outer surface of the curved side wall of the nozzle cap body is substantially cylindrical.

16. A nozzle cap assembly comprising:
   a nozzle cap body defining a top end and a bottom end, the nozzle cap body defining a base positioned at the top end and a curved side wall extend from the base down to the bottom end, the curved side wall at least partially defining internal threading and a bore extending from the bottom end to the base;
   an enclosure coupled to the top end, the enclosure rotationally fixed relative to the nozzle cap body, the enclosure rotationally fixed relative to the nozzle cap body, the enclosure at least partially defining an enclosure cavity;
   a nut base positioned opposite from the nozzle cap body, the enclosure positioned between the nut base and the base, the nut base rotationally fixed relative to the nozzle cap body;
   a first antenna structure positioned within the enclosure cavity, the first antenna structure configured to communicate over a GPS frequency band;
   at least one power source positioned within the enclosure cavity;
   a modem positioned within the enclosure cavity; and
   an antenna assembly comprising a second antenna structure, the antenna assembly coupled in electrical communication to the modem.

17. The nozzle cap assembly of claim 16, wherein the antenna assembly comprises a flexible printed circuit board.

18. The nozzle cap assembly of claim 16, further comprising a printed circuit board positioned within the enclosure cavity, and wherein a vibration sensor is connected in electrical communication with the printed circuit board.

19. The nozzle cap assembly of claim 1, further comprising an axial axis wherein:
   the nozzle cap body extends along the axial axis extending from the top end to the bottom end;
   the enclosure is coupled to the top end of the nozzle cap body and extends along the axial axis; and
   the nut base rotates about the axial axis.

20. The nozzle cap assembly of claim 1, further comprising an antenna structure coupled to the enclosure and electronically coupled to a power source positioned within the enclosure cavity.

* * * * *